United States Patent
Pieper

(10) Patent No.: US 10,414,375 B2
(45) Date of Patent: Sep. 17, 2019

(54) LOCK CYLINDER HAVING A RESETTING BLOCK

(71) Applicant: Huf Hülsbeck & Fürst GmbH & Co. KG, Velbert (DE)

(72) Inventor: Friedrich Pieper, Töging (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 86 days.

(21) Appl. No.: 15/314,511

(22) PCT Filed: Jun. 1, 2015

(86) PCT No.: PCT/EP2015/062183
§ 371 (c)(1),
(2) Date: Nov. 29, 2016

(87) PCT Pub. No.: WO2015/181400
PCT Pub. Date: Dec. 3, 2015

(65) Prior Publication Data
US 2017/0190315 A1  Jul. 6, 2017

(30) Foreign Application Priority Data

May 30, 2014  (DE) .......................... 10 2014 107 639
Apr. 28, 2015  (DE) .......................... 10 2015 106 568

(51) Int. Cl.
*B60R 25/021*  (2013.01)
*B60R 25/20*  (2013.01)
(Continued)

(52) U.S. Cl.
CPC ...... *B60R 25/02102* (2013.01); *B60R 25/021* (2013.01); *B60R 25/02121* (2013.01);
(Continued)

(58) Field of Classification Search
CPC ............ B60R 25/021; B60R 25/02102; B60R 25/0215; B60R 25/0211; B60R 25/02115; B60R 25/02121; B60R 25/02123
See application file for complete search history.

(56) References Cited

U.S. PATENT DOCUMENTS 5,197,312 A * 3/1993 Akutsu ............. B60R 25/02144
477/99
5,289,707 A * 3/1994 Suzuki ............. B60R 25/02123
70/186
(Continued)

FOREIGN PATENT DOCUMENTS

EP  0742127  11/1996
EP  1378406  1/2004
(Continued)

OTHER PUBLICATIONS

International Search Report and the Written Opinion dated Sep. 17, 2015 From the International Searching Authority Re. Application No. PCT/EP2015/062183 and Its Translation of Search Report Into English.

*Primary Examiner* — Christopher J Boswell

(57) ABSTRACT

Lock cylinder for an ignition starter switch or a wheel lock at a vehicle with a cylinder core which is at least pivotably received in a cylinder housing. At least one blocking member prevents a rotation of the cylinder core in the cylinder housing in a blocking position and in a releasing position releases a rotation in the cylinder housing. A key channel extends through the cylinder core in which a key is insertable and with which the blocking member is movable between the blocking position and the releasing position. At least two rotation positions can be occupied. In the off-position a key is insertable and detractable in the key channel and in the starting position a vehicle starter can be switched on.

A mechanical resetting block prevents a resetting of the cylinder core from the starting position to the off-position by a simple rotation of the cylinder core.

19 Claims, 39 Drawing Sheets

(51) Int. Cl.
*B60R 25/04* (2013.01)
*E05B 85/06* (2014.01)

(52) U.S. Cl.
CPC ........ *B60R 25/02123* (2013.01); *B60R 25/04* (2013.01); *B60R 25/2063* (2013.01); *E05B 85/06* (2013.01); *B60K 2370/126* (2019.05)

(56) References Cited

U.S. PATENT DOCUMENTS

| | | | | |
|---|---|---|---|---|
| 5,656,867 | A * | 8/1997 | Kokubu | B60R 25/021 180/287 |
| 6,003,349 | A * | 12/1999 | Nagae | B60R 25/02115 70/186 |
| 6,354,117 | B1 * | 3/2002 | Canard | B60R 25/02121 70/186 |
| 6,810,700 | B2 * | 11/2004 | Okuno | B60R 25/02126 70/186 |
| 7,267,018 | B2 * | 9/2007 | Kai | B60R 25/02121 33/533 |
| 8,857,231 | B2 * | 10/2014 | Perrin | B60R 25/02 70/183 |
| 9,555,770 | B2 * | 1/2017 | Kiso | B60R 25/02115 |
| 2008/0041128 | A1 * | 2/2008 | Ohtaki | B60R 25/04 70/237 |
| 2011/0100075 | A1 | 5/2011 | Cho et al. | |

FOREIGN PATENT DOCUMENTS

| | | |
|---|---|---|
| GB | 2362932 | 12/2001 |
| WO | WO 2015/181400 | 12/2015 |

\* cited by examiner

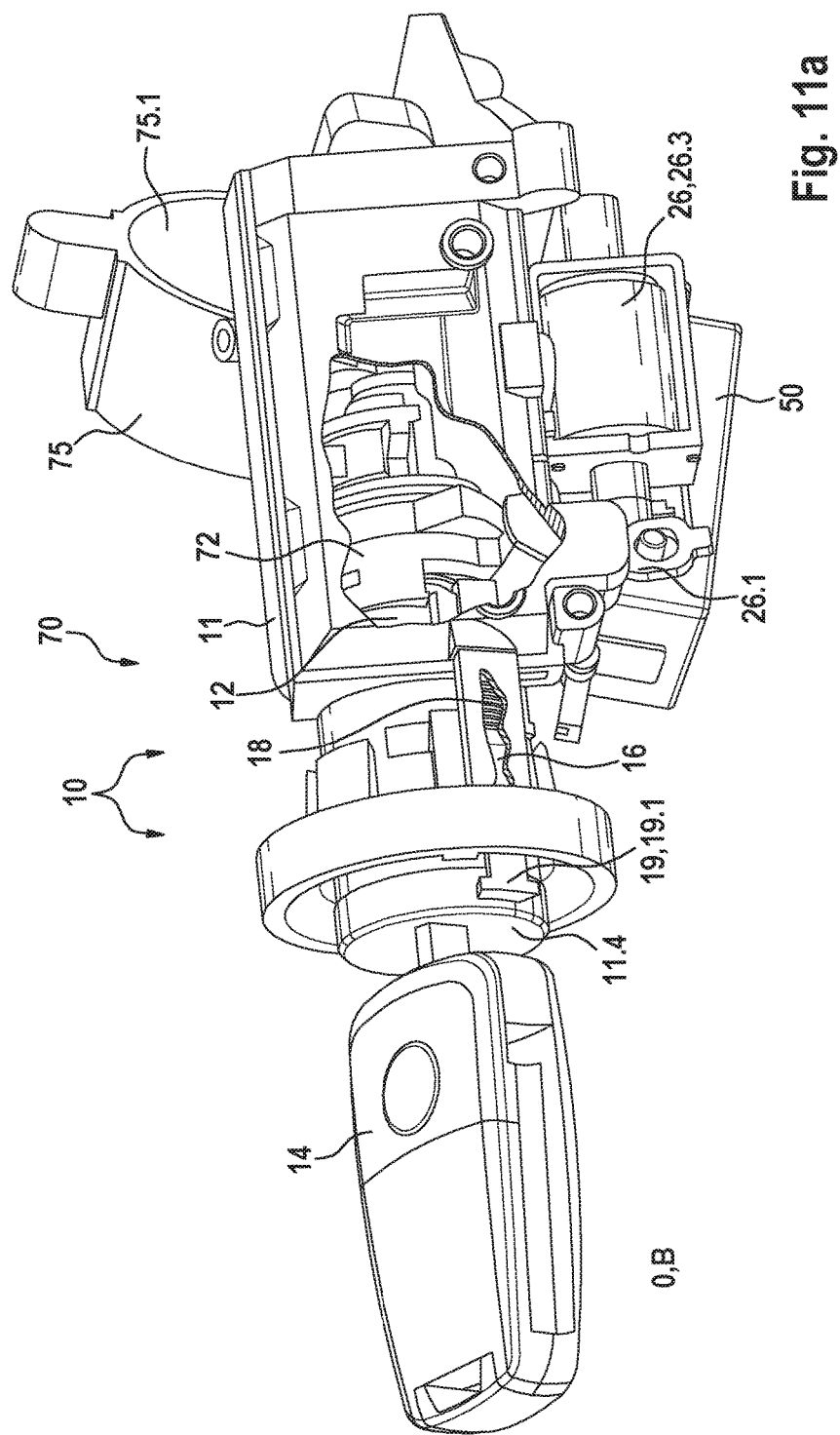

I/II,B

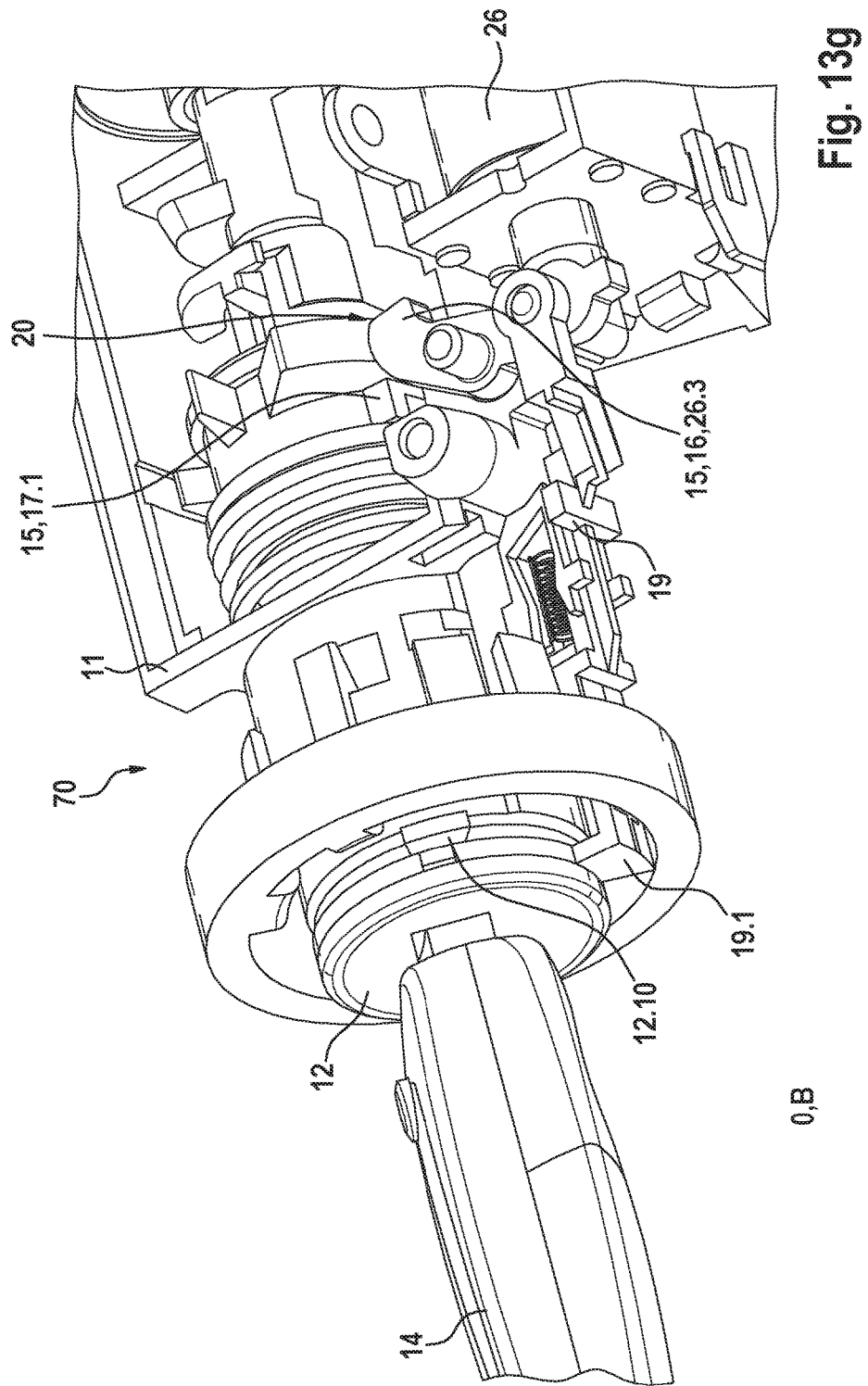

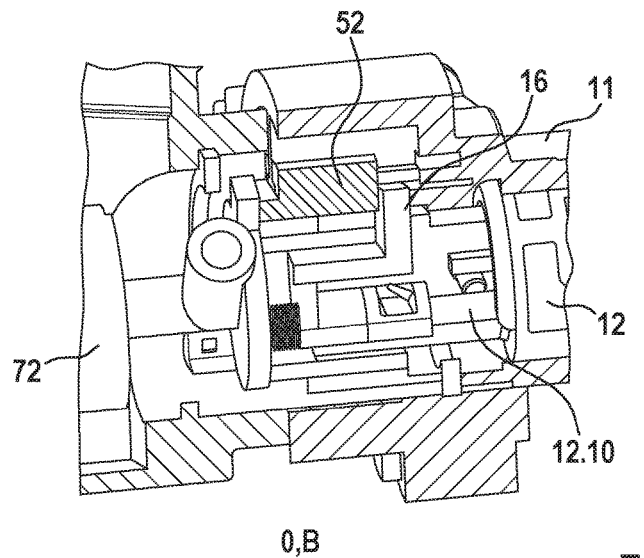
Fig. 14b
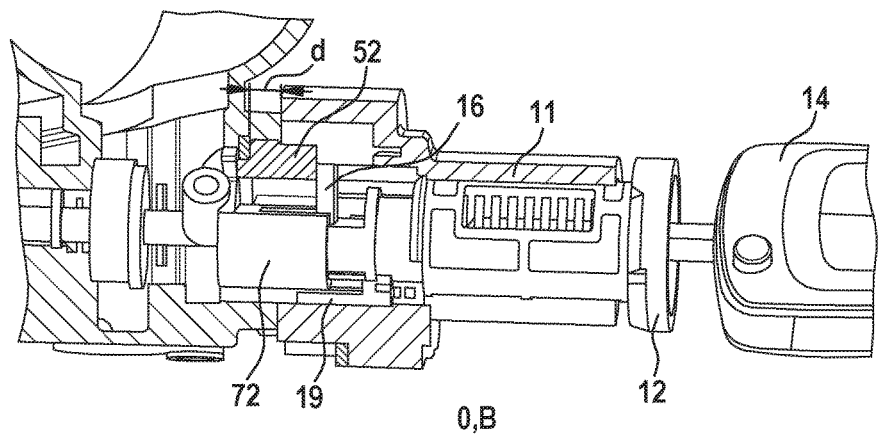
Fig. 14c1

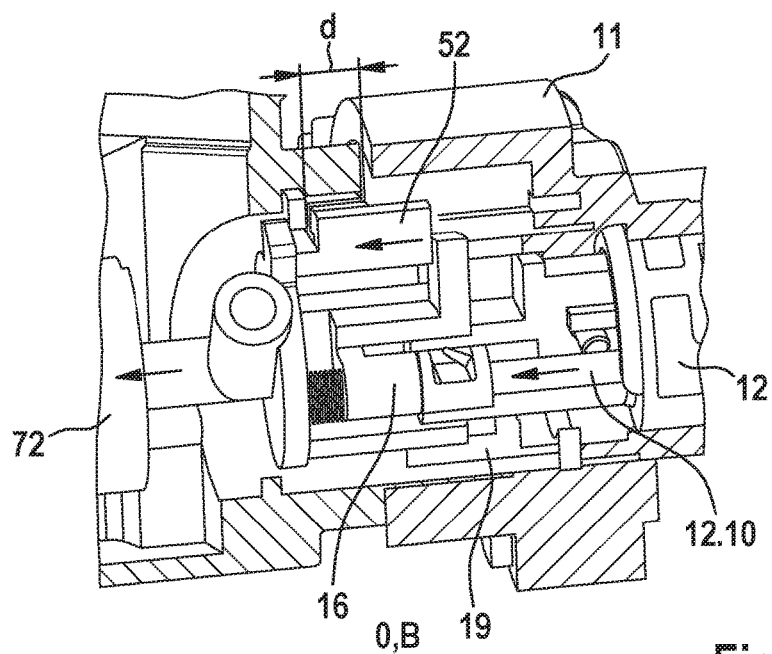
Fig. 14c2
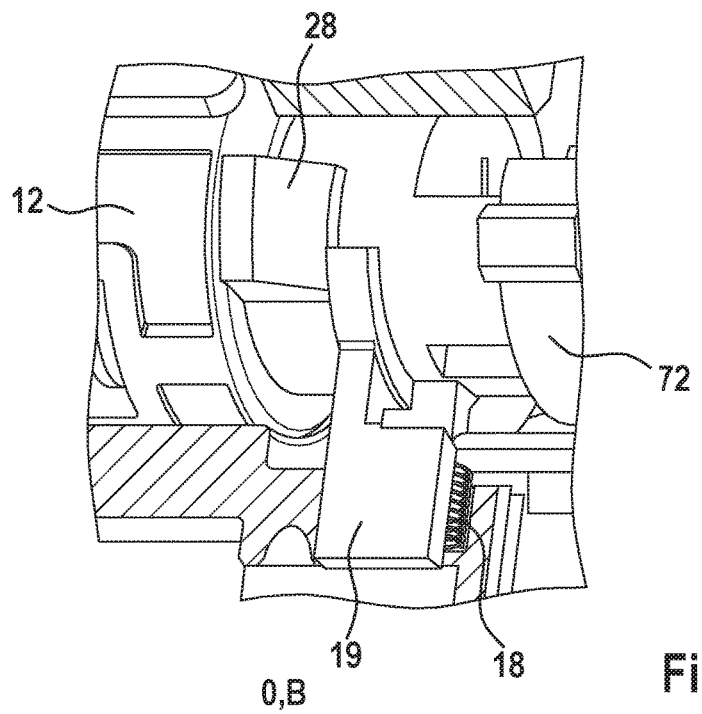
Fig. 14c3

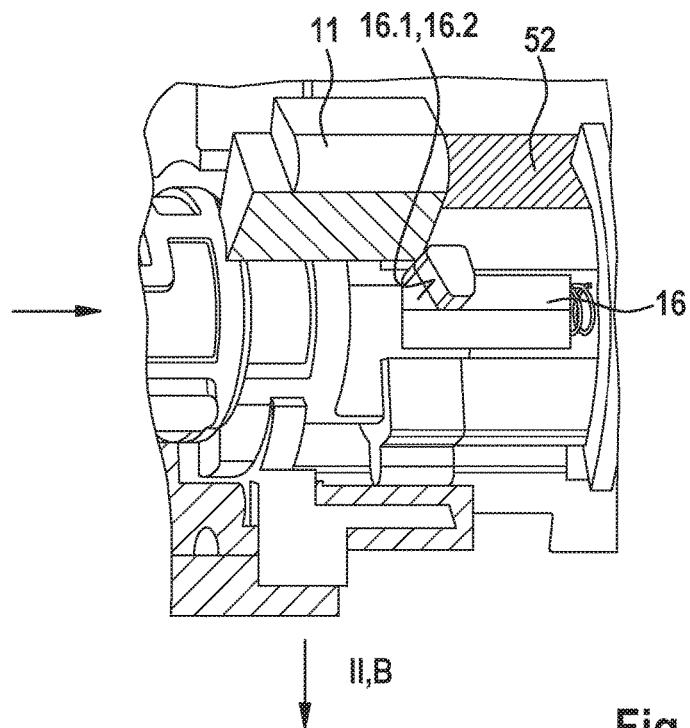
Fig. 14f1
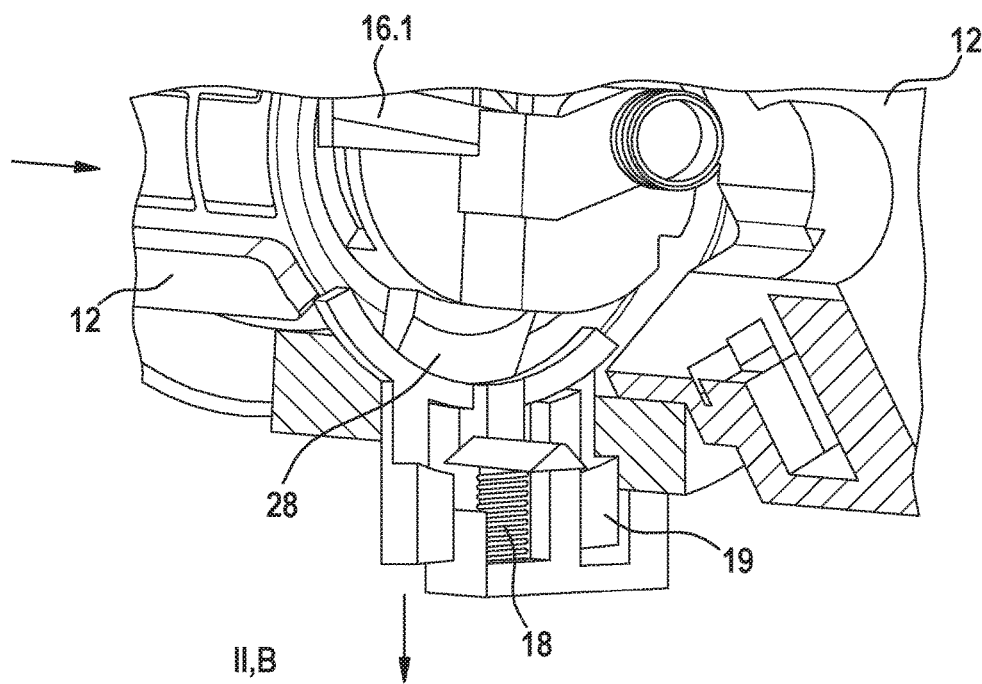
Fig. 14f2

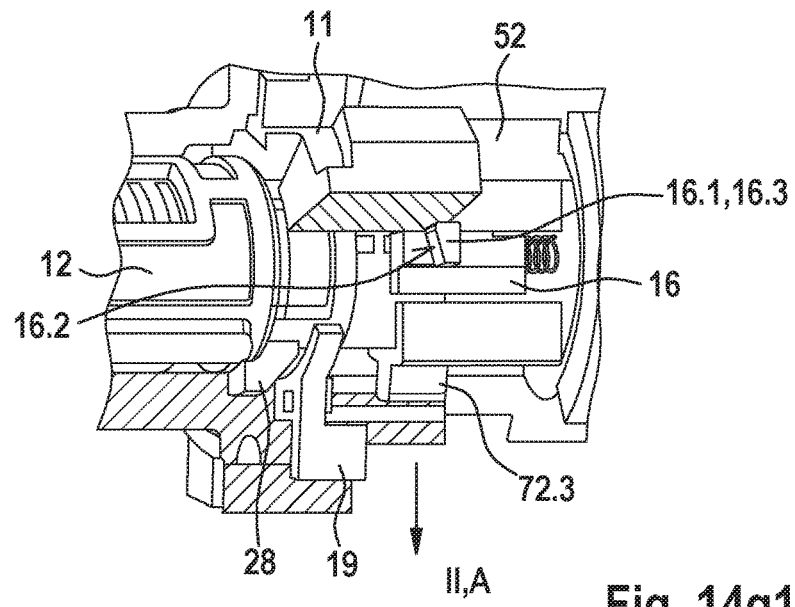
Fig. 14g1
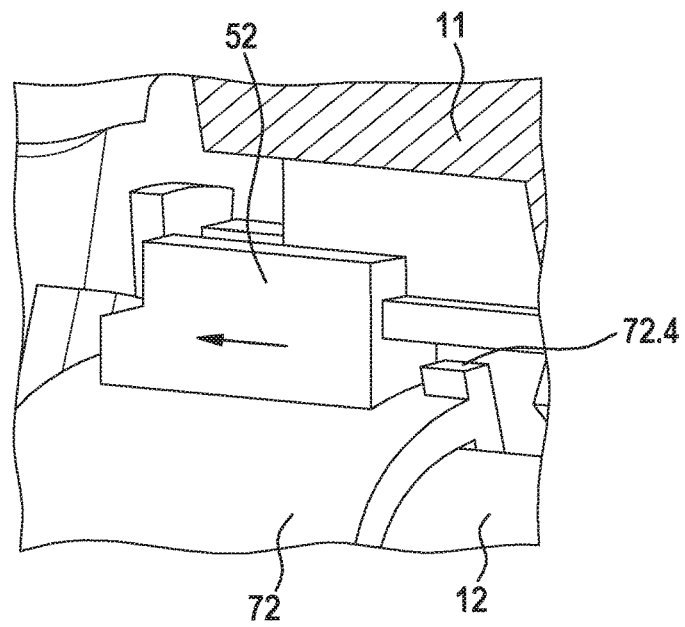
Fig. 14g2

LOCK CYLINDER HAVING A RESETTING BLOCK

RELATED APPLICATIONS

This application is a National Phase of PCT Patent Application No. PCT/EP2015/062183 having International filing date of Jun. 1, 2015, which claims the benefit of priority of German Patent Applications Nos. 10 2014 107 639.7 filed on May 30, 2014, and 10 2015 106 568.1 filed on Apr. 28, 2015. The contents of the above applications are all incorporated by reference as if fully set forth herein in their entirety.

DESCRIPTION

The present invention is directed to a mechanic lock cylinder for at least ignition starter switch or a wheel lock of a vehicle according to the preamble of claim 1. Such lock cylinders are mechanically complex components which comprise a cylinder core which is at least pivotable mounted in a cylinder housing. Further, within the cylinder core at least locking member is provided which avoids a rotation of the cylinder core within the cylinder housing in the blocking position and in the releasing position a rotation within the cylinder housing is released as long as a suitable key is used. Therefor a key channel is intended within the cylinder core in which the key can be inserted with its key bit and with which the locking member is movable between the blocking position and the releasing position wherein at least two rotation positions can be taken by the cylinder core, namely an off-position and a starting position wherein in the off-position a key can be inserted and exerted and in the starting position at least an appliance, particularly a starter of the vehicle, can be switched on. Further, the present invention relates to a wheel lock for blocking a functionally essential component of the vehicle according to the preamble of claim 15. As a functionally essential component a steering-wheel or a gear shift is possible here. Further, the present invention is related to a method for operating a lock cylinder or a wheel lock according to the preamble of claim 18.

FIELD AND BACKGROUND OF THE INVENTION

From the state of the art, diverse lock cylinder for vehicles are known, thus for example from reference DE 203 21 590 U1. Such lock cylinders can be used within the vehicle in the area of the door handle for locking and unlocking a door or central locking system for the doors and a wheel lock. Especially with the use of a lock cylinder with wheel lock or with an ignition switch an increased safety is necessary since operating errors by the driver can immediately lead to undesired electric and/or mechanic switch status within the vehicle which lead to an accident. Thus, for example an undesired adjustment of the lock cylinder in an off-position leads to the fact that all electric appliances of the vehicle are turned off like for example the motor, the servo steering, the power brake, the anti-locking system for the brake and so on. Thereby, a significantly increased accident risk is given. Additionally, further requirements to such lock cylinders with the use of a wheel lock are existing in order to for example avoid an additional starting of an already started engine of the vehicle by the starter. For this purpose, for example blocking elements against repeated starting are used like for example disclosed in reference EP 2 253 519 A1.

SUMMARY OF THE INVENTION

Object of the present invention is therefor to provide a lock cylinder for at least an ignition starter switch or a wheel lock of a vehicle and a wheel lock for a vehicle and an operating method for a lock cylinder or a wheel lock which comprises an increased safety, particularly functional safety in addition to the anti-theft device. Thereby, it is particularly the object of the invention to develop the handling of the lock cylinder and the wheel lock and the corresponding operation method particularly simple and secure.

The present problem is solved by a lock cylinder for at least an ignition starter switch or a wheel lock of a vehicle with the features of claim 1, particularly from the characterizing clause. Likewise, for solving the object a wheel lock for blocking a functionally essential component of a vehicle with the features of claim 15, particularly from the characterizing clause. Likewise, for solving the object a method for operating the lock cylinder or a wheel lock of the vehicle with the features of claim 18, particularly from the characterizing clause, is suggested. In the dependent device and method claims, preferred embodiments of the invention are disclosed. Features which are disclosed regarding the lock cylinder according to the invention thereby also serve for the wheel lock according to the invention and the method according to the invention and vice versa. Likewise, the features from the wheel lock according to the invention apply for the method according to the invention and vice versa such that between the single aspects of the present invention it can always be reciprocally related to. Further, the lock cylinder according to the invention can be used for the wheel lock according to the invention and the method according to the invention can be performed with the lock cylinder.

With the lock cylinder according to claim 1, it is intended according to the invention that a resetting block is provided which prevents a resetting of the cylinder core at least from the starting position into the off-position by a simple turning of the cylinder core. Said resetting block can be a simple mechanic or electro-mechanic resetting block which particularly blocks the resetting of the cylinder core within the cylinder housing in a form- and a force-fitting manner, Hereby, it is prevented that by an undesired simple rotation of the cylinder core the off-position and therewith the switching-off of the engine and other electric appliances and possibly even a blocking of the steering-spindle or such a functionally essential component can occur. With the term "simple rotation of the cylinder core" it has to be understood that an exclusive rotation of the cylinder core like it occurs during ignition of the engine from the off-position into the starting position and vice versa is not possible. Rather, an additional desired and manual action for rotation is necessary in order to enable a resetting of the cylinder core. Therefor the resetting block has to be consciously handled or released. The simple resetting of the cylinder core by the up to now usual backing of the key is therewith impossible in order to at least achieve the off-position.

Preferably, with the present invention it is intended that the resetting block prevents a resetting of the cylinder core from the driving position into the off-position, particularly into the ACC-position by a simple rotation of the cylinder core. This means that an exclusive rotation of the cylinder core is not sufficient in order to turn the cylinder core from the driving position into the ACC-position or further backwards in the off-position. Rather, a conscious actuation of the resetting block has to occur by the driver.

Preferably, it can be additionally intended within the scope of the present invention that the resetting block prevents a resetting of the cylinder from the driving position into the off-position by a particularly exclusive rotation of the cylinder core. Therewith, it is meant that a simple rotation of the cylinder core into the off-position is not possible. Rather, an actuation of the resetting block has to occur when the cylinder core should be transferred from the driving position into the off-position or even in the ACC-position. Therewith, a resetting of the cylinder core from the driving position into the ACC-position can already be blocked through the resetting block. Since the off-position with which the resetting process of the cylinder core achieves after the ACC-position the resetting lock blocks an undesired resetting of the cylinder core such early that a particularly high safety standard is realized since in the ACC-position (ACC means accumulator) the electric appliance of the vehicle can be switched on and can stay turned on when the cylinder core is already in the driving position. Therewith, it is not possible to transfer the cylinder core from the driving position back into the ACC-position or even into the off-position in an undesired or unintended manner by a simple exclusive rotation.

According to the invention it can be further intended that the cylinder core comprises at least three stable rotation positions, namely an off-position, an ACC-position and a driving position in which the cylinder core is fixed by a fixing element, particularly in a force- and form-fitting manner. This fixing element can for example be configured as a ball catch and act directly with the cylinder core in order to fix the cylinder core in said stable rotation position from which the cylinder core can only be turned by a slightly increased application of force via the key into the next rotation position. However, the fixing element can also be intended in a subsequent ignition starter switch which then generates the stable rotation positions of the cylinder core. A corresponding ignition starter switch can be brought into mechanic operative connection with the lock cylinder via a coupling element.

Further, it is possible that the cylinder core comprises at least one instable rotation position, namely a starting position which is only achievable against an acting additional rotary force. This additional rotary force can thereby permanently act on the instable rotation position in order to transfer the cylinder core from this instable rotation position in the next, particularly driving, position. Therewith, it is ensured that the cylinder core cannot reach the starting position from the driving position unintentionally.

Further, it should be mentioned that it is likewise intended according to the invention that a locking element for repeated starting is existent which prevents the cylinder core from being transferable from the driving position into the starting position more than once, meaning exactly once. The starting position thereby serves in a vehicle for the fact that it starts the starter for a combustion engine. However, as soon as a combustion engine is started, the starter has to be turned off in order to not getting damaged. Likewise, it is a great advantage when the lock cylinder prevents a repeated starting of the starter in that a repeated rotation of the lock cylinder core from the driving position into the starting position is prevented in case this was already reached before. Rather, it is necessary that after a unique achievement of the starting position the cylinder core has to be turned backwards into the off-position in order to overcome the resetting block for repeated starting and to be able to rotate the cylinder core from the off-position into the starting position again.

Further, it is possible within the scope of the present invention that the resetting block blocks the cylinder core, particularly in a form-fitting manner with a simple rotation of the cylinder core from the starting position into the off-position. Thereby, it is ensured that the cylinder core, even with a higher application of force to the cylinder core, cannot be transferred from the starting position into the off-position in a simple manner via the key. Advantageously, the form-fit of the resetting block blocks the cylinder core only from the driving position into the off-position or also in the ACC-position like already described. Only by a damage of the form-fit from the resetting block the cylinder core can be transferred from the starting position or driving position into the ACC-position or the off-position. Therewith, a maximum safety of the cylinder core according to the invention is achievable.

Likewise, it is possible within the scope if the invention that the resetting block comprises an adjustable blocking element which mechanically blocks the rotation of the cylinder core from the driving position into the off-position in the blocking position and in a releasing position releases the cylinder core into the off-position. Hereby, the resetting block can block the rotation of the cylinder core from the driving position into the ACC-position in the blocking position with the adjustable blocking element. By an early blocking of the cylinder core in the driving position to the ACC-position, the safety of the block cylinder is significantly increased like already described.

According to the invention, it is possible that the resetting block is assembled between the cylinder housing and the cylinder core. Therewith, the already described form-fit of the resetting block between the cylinder core and the cylinder housing can be intended like with blocking members which interact with the key. Thereby, it is possible that the resetting block is assembled between the inner surface shell of the cylinder housing and the outer surface shell of the cylinder core. By the lateral assembly of the resetting block, the overall length of the lock cylinder according to the invention can be reduced. However, it is also possible that the resetting block is assembled between a frontal or back front surface of the cylinder core and the complimentary inner surface of the cylinder housing. With this variation, the overall length of the lock cylinder is increased, wherein however the width of the closing cylinder can be reduced. Further, it is possible that the resetting block is assembled directly in the area of the insertion opening for the key channel. Hereby, a particularly compact assembly of the lock cylinder according to the invention can be realized. According to the configuration of the lock cylinder and the intended assembly dimensions however, the resetting block can be intended at the opposing edge of the cylinder core of the insertion opening of the key channel. This assembly is particularly advantageous in case of a longitudinal shift of the cylinder core for the actuation of the resetting block. The actuation of the blocking resetting block, meaning the transition of the resetting block from the blocking position into the releasing position, can be performed by a longitudinal shift of the cylinder core in the cylinder housing like previously described or by an actuation of the actuation element which mechanically interacts with the adjustable blocking element. With the longitudinal shift of the cylinder core for overcoming the resetting block, quasi servers the cylinder core itself or the key as the actuation element. Thereby, a compressive force or a tensile force on the key which is assembled in the key channel of the cylinder core leads to a longitudinal shift of the cylinder core and the cylinder housing and therewith to a transition of the adjustable blocking element of the resetting block from the blocking position into the releasing position. However, as far as the resetting block is assembled with an additional actuation element, this mechanically interacts with the adjustable blocking element in order to repeal the form-fit in the blocking position and to transfer the resetting block or the adjustable blocking element into the releasing position. The corresponding actuation element can be configured as a knob, ring, particularly ring-like cap or as a key (in order to longitudinally shift the cylinder core).

Likewise, it is possible that the resetting block is assembled in an actual extension of the cylinder core. Hereby, the lock cylinder according to the invention can be configured particularly small (see for example FIGS. 9a to 9g and 10a and 10b). Further, the resetting block can be assembled in a secure area with the wheel lock which is assembled away from the outer access during an attempt of breaking in. With the use of lock cylinder according to the invention within the scope of a wheel lock the resetting block can be assembled between the cylinder core and a control element for a locking bolt for the functionally essential component of the wheel lock, Hereby, the resetting block can comprise a movable coupling element which is connected to the cylinder core in a torque-proof manner. By "torque-proof" has to be understood that a rotation from the cylinder core to the movable coupling element is transferred to the resetting block. For the transfer of the movement, a corresponding coupling element in form of an actuator can be configured at the cylinder core. This coupling element can be configured from a triple-square screw, from a polygon or suchlike which interacts with a geometrically complementary configured counterpart in the resetting block in a form-fitting manner. By this coupling element, the rotation movement of the cylinder core can be transferred to the movable coupling element wherein however preferably the cylinder core can be configured with a movable coupling element in an axial shiftable manner.

According to the invention it is possible that the resetting block comprises a blocking path to the adjustable locking element which at least in the blocking position form-fittingly interact, wherein particularly the form-fit is repealed when the adjustable blocking element is in the releasing position and therewith the adjustable blocking element does not engage in the blocking path. Thereby, the adjustable blocking element can be configured bolt-like and the blocking path can comprise an arch-like or L-like guide groove for the adjustable blocking element in the blocking position, Hereby, it is possible that the adjustable blocking element is assembled in or at the cylinder housing and the blocking path in or at the cylinder core. Further, a respective complementary assembly of the blocking path and the adjustable adjustable blocking element is possible. The assembly of the blocking element at the cylinder housing facilitates the assembly of the lock cylinder according to the invention and a possible exchange of the adjustable blocking element with a wearing.

Further, it is possible that the adjustable blocking element comprises a control slope which mechanically interacts with a counter-control slope wherein the adjustable blocking element is longitudinally shiftable assembled in or at the lock cylinder. Hereby, particularly a longitudinal shift of the adjustable blocking element can be generated in order to transfer the adjustable blocking element from the releasing position into the blocking position and vice versa. Thereby, for example a pressure on the actuation element of the resetting block can generate a shifting of the counter-control slope which interacts with the control slope of the adjustable blocking element and shifts the control slope accordingly. By an intended spring the adjustable blocking element can be pushed out of the blocking position by itself into the releasing position. The control element itself can be assembled in a stationary part of the resetting block whereas the counter-control slope configures at least a movable part to the stationary part of the resetting block.

Further, it is possible that the in the cylinder core provided blocking members are assembled in so called blocking member retainers and are thereby spring-loaded in order to achieve a form-fit between the cylinder core and the cylinder housing in the blocking position. Preferably, sheet-like elements can be used as blocking members which are particularly stable and therewith increase the break-in safety of the lock cylinder. In order to enable an activation of the sheet-like blocking members, those can comprise a conduction opening for the key bit of the key wherein a sheet-like blocking members are shiftable back and forth within the cylinder core. In the blocking position, the blocking members are extending from the cylinder core on the surface shell side and form-fittingly interact with at least one recess in the lock cylinder housing. In the releasing position, all blocking members are retracted in the cylinder core such that the form-fit between the cylinder core and the cylinder housing is repealed and a rotation of the cylinder core in the cylinder housing is possible by the insertion of the fitting key.

In order to increase the safety, particularly the break-in safety of the lock cylinder according to the invention, additionally at least one safety element can be assembled in the area of the key channel in or at the cylinder core. Thereby, said safety element configures particularly slice-like and like the blocking members comprises a conduction opening for the key bit of the key which is configured more or less geometrically complementary to the outer contour of the key bit. Advantageously, the safety element is configured from tempered steel such that a drilling of the key channel becomes impossible. Ideally, the safety element is configured rotation symmetrically for the conduction opening such that the conduction opening can be rotated in the cylinder core during an attempt to drill. The safety element can also be assembled in form of a cap in front of or within the area of the insertion opening for the key channel.

Further, it is optionally possible that the adjustable blocking element of the resetting block is assembled rigidly to the cylinder housing (see for example FIGS. 9a to 9g and FIGS. 10a and 10b). Therewith, adjustable the blocking element itself performs no movement of the cylinder housing and is moreover direct or indirect rigidly assembled, meaning particularly at the outer radial extent. Further, the adjustable blocking element can be configured in form of a cam which preferably comprises a control element. The control element can comprise the form of a leading slope in order to optimally slide at the blocking path of the resetting block. Advantageously, this adjustable blocking element interacts mechanically with at least one longitudinally shiftable coupling element with the already described blocking path of the resetting block. Advantageously, the coupling element is configured torque-proof with a cylinder core such that the coupling element rotates along with the rotation of the cylinder core. Further, it is advantageous that a longitudinally shiftable coupling element is spring-loaded pushable in the direction of the cylinder core by a spring. Additionally, an operating path for the position sensor can be intended at the coupling element. By this position sensor the rotation position of the cylinder core of the therewith combined rotation of the coupling element can be metrologically determined. Further, it is possible that at the coupling element a longitudinal guidance for a control element of the wheel lock is intended wherein the control element mechanically interacts with the locking bolt in order to be able to block the functionally essential component, particularly in form of a steering-column. Therewith, also the control element is torque-proof but (axial) longitudinally shiftably assembled to the movable coupling element (and therewith to the cylinder core). Further, the control element can directly or indirectly interact with an ignition starter switch via an actuator and therewith the rotation movement of the cylinder core can be transferred to the ignition starter switch. With this configuration, the control element can be pivotable itself, but not axially shiftable within the wheel lock. Moreover, it is advantageous that only the cylinder core is shiftable with the coupling element by a rotation of the cylinder core axial to the cylinder housing (and also within the wheel lock). By said longitudinal guidance between the coupling element and the control element, in fact the rotation movement of the cylinder core is transferred, however not the actual longitudinal shift such that the control element is assembled stationarily within the wheel lock in axial direction to the axis of rotation. Advantageously, the control element interacts mechanically with the locking bolt for the functionally essential component wherein the blocking element itself is spring-loaded and is pushed into the direction of a resting position by the spring, meaning towards the functionally essential component.

In order to support and facilitate an axial shifting of the cylinder core to the cylinder housing, a shifting element, particularly in form of a lever element, can be intended between the cylinder housing and the cylinder core (see for example FIGS. 10a and 10b). This lever element advantageously comprises a fixed turning point and is pivotably connected with the cylinder core via an axis of rotation. The shifting element can be configured triangle-like and still correspond with the form of a lever element. The lever element can thereby comprise two sections wherein the rotation point is intended between the two sections. Thereby, the first section can interact with the key for the lock cylinder and the second section can support itself at the cylinder housing when the key is inserted into the key channel. By the insertion of the key, the shifting element is automatically actuated since the key bit touches the first section of the shifting element and therewith turns the shifting element about the rotation point. At the same time, the second section is hereby pushed away from the cylinder housing such that a longitudinal shifting of the cylinder core to the cylinder housing occurs. Therewith, the shifting element supports the axial shifting of the cylinder core to the cylinder housing by insertion of the key into the key channel. By a lever-like configuration of the shifting element, an optimized power transmission occurs wherein the longitudinal shift of the cylinder core with the coupling element takes place particularly simple.

A further longitudinal shifting of the cylinder core with the coupling element can occur by the adjustable blocking element sliding along the blocking path from the coupling element (see for example FIGS. 9a to 9g and 10a and 10b). For this purpose, the adjustable blocking element is ideally configured as a cam with a leading slope and acts together with the blocking path at the coupling element. The blocking path itself can comprise an offset (particularly rectangular) behind which the adjustable blocking element can form-fittingly rest in order to achieve the blocking position of the resetting block with the desired form-fit. This occurs automatically when the cylinder core is turned from the off-position in the direction of the starting position by the appropriate key. Thereby, the adjustable blocking element pushes the longitudinally slidable coupling element along the blocking path until the adjustable blocking element rests by a further rotation behind the offset in the blocking path and the desired form-fit of the resetting block is achieved in the blocking position (preferably in driving position II of the cylinder core). The cylinder core can only be released from this locking position when a pressure on the key results in a further longitudinal shifting in axial direction from the cylinder core with a coupling element in order to repeal the form-fit between the adjustable blocking element and the offset of the blocking path and therewith the cylinder core can be rotated backwards in the direction of the off-position. Therewith, a certain pressure has to be acted on the key in order to unlock the resetting block (preferably from the driving position II of the cylinder core). Otherwise, the form-fit cannot be overcome in the locking position of the resetting block.

Within the scope of the invention, it is further possible that a key detraction blocker is existent which interacts with the key, particularly the key bit and a locking bolt of a wheel block in a way that the locking bolt remains in the releasing position until a detraction of the key from the key channel occurs. By the detraction blocking likewise the functional safety of the block cylinder is significantly increased. Therewith, it is ensured that the locking bolt of the wheel lock is further assembled in the releasing position, even if the cylinder core is turned into the off-position. Only by an incomplete detraction of the key from the key channel the locking bolt is transferred in its blocking position. Until then a functionally essential component of the vehicle is blocked by the wheel lock.

Further, it is possible within the scope of the present invention that with the lock cylinder according to the invention and/or the wheel lock according to the invention already existing components are modified in a way that a resetting block according to the invention can be achieved such that a rotation of the lock cylinder at least from the starting position into the off-position is avoided by a particularly simple rotation of the cylinder core wherein preferably the resetting of the cylinder core from the driving position or the ACC-position through the resetting block is avoided (see for example FIGS. 11 to 14). For this purpose, for example the control element for the locking bolt can be used at the same time as an essential component of the resetting block. Further, it is possible that for example the key detraction blocker serves as part of the resetting block wherein here a simple manual key detraction blocker or a partly automated key detraction blocker can be used. Further, a latch for the cylinder core which is normally used to detract or exchange the cylinder core during a damage from the cylinder housing can be used in order to at least build a part of the resetting block.

According to the invention it can be intended that the actuation element is configured rod-like and establishes an integrated component with the adjustable blocking element. Thereby, the adjustable blocking element can comprise a particularly L-like offset at its free edge which is directed radially to the axis of rotation of the lock cylinder and possibly mechanically interacts with a blocking path at a control element (for the locking bolt of a wheel lock). Thereby, this blocking path of the control element can be configured as an arch-like projection which can likewise comprise an L-like offset wherein the L-like offset can direct radially outwards, meaning away from the axis of rotation of the control element. Therewith, this arch-like projection of the control element together with the free edge of the adjustable blocking element configure the mechanic resetting block for the cylinder core. Thereby, the control element can be rigidly connected with the cylinder core in a direct or indirect manner and the rotation of the cylinder core can occur. Further, the control element follows each axial movement of the cylinder core such that both components towards one another cannot perform a relative movement (see for example FIGS. 11a to 11f). Hereby, it is an advantage when the cylinder core is also pivotable but axial nonshiftable within the cylinder housing of the lock cylinder. This common component which results from an actuation element and a adjustable blocking element, is advantageously only longitudinally shiftable within the cylinder housing and thereby spring-loaded. By pressure on the knob of the actuation element a form-fit of the resetting block can be dissolved then in order to be able to turn the cylinder core from the starting or driving position backwards into the off-position.

Likewise, it is possible that the already described latch is usable for the securing of the cylinder core in the cylinder housing at the same time as an adjustable locking element of the resetting block (see for example FIGS. 12a to 12e). Thereby, the locking cylinder is at least in the locking position of the resetting block assembled axially shiftable in the cylinder housing. Further, a shifting element can be intended between the cylinder core and the control element wherein the control element can be pushed away from the cylinder core during the insertion of the key in the key channel of the cylinder core. The control element however can be axially shiftable to the cylinder core and connected torque-proof to the cylinder core. The latch for which the cylinder core can radially extent towards the outside of the cylinder core and thereby mechanically interacts particularly with the blocking path of the cylinder housing. Thereby, the blocking path at the cylinder housing can comprise an arch-like radially reducing offset which interacts with the latch for the cylinder core form-fittingly in the blocking position of the resetting block. This form-fit between the latch and the cylinder housing can be released by a pressure movement of the key in the direction of the cylinder core in which the cylinder core axially shifts and the latch is released behind the offset of the blocking path. In the releasing position, the cylinder core can be turned backwards again, at least from the starting position into the off-position. The cylinder core can therefore be axially shiftable and pivotably mounted within the cylinder housing and is torque-proof connected with the likewise axially shiftable control element which likewise is pivotable within the cylinder core.

Likewise, it is possible within the scope of the present invention that the key detraction blocker serves as part of the resetting block. For this purpose, the actuation element can likewise mechanically interact with the key detraction blocker in order to hereby be able to transfer the resetting block from the blocking position into the releasing position. The actuation element can thereby be configured longitudinally shiftable as a rod-like element which is longitudinally shiftable within the cylinder housing against a spring. The spring can pull the actuation element into the wheel lock. Preferably at the cylinder core on the level of the insertion opening for the key a radially outwardly extending cam can be intended which in the blocking position of the resetting block mechanically interacts with the actuation element. The frontal edge of the actuation element which is likewise facing into the direction of the insertion opening of the cylinder core can thereby comprise an L-like offset which points radially towards to axis of rotation of the cylinder core. Behind this L-like offset, the cam can drive into the locking position of the resetting block at the cylinder core in order to achieve an actuation of the resetting block into the releasing position in case of a tension at the cylinder core (see for example FIGS. 13a to 13g). Further, it is preferably intended that the key detraction blocker mechanically interacts with a blocking path at the control element for the locking bolt of the wheel lock. Hereby, the key detraction blocker can be configured automatically with a drive which can be particularly configured as a lifting magnet and acts on a mechanical blocking lever which is rigidly pivotable about a rotation point. The free edge of the blocking lever of the key detraction blocker can thereby preferably mechanically interact with a blocking path at the control element for the locking bolt of the wheel lock and established form-fit in the blocking position of the resetting block. Further, the key detraction blocker can reach a form-fit with the control element even if for example no gear is engaged or in an automatic gear the selection lever is not in the P-position in order to therewith avoid an undesired retraction of the key from the cylinder core. Advantageously, the cylinder core is axially shiftable but torque-proof connected with the control element for the locking bolt of the wheel lock wherein an axial relative movement is possible which is complicated by an additional spring with the pull movement of the cylinder core. Therewith, the additional spring serves for the fact that the cylinder core is retracted back into the cylinder housing.

Optionally, it can be intended according to the invention that the resetting block is configured by a projection at the cylinder housing with a torque-proof adjustable blocking element at the cylinder core (see for example FIGS. 14a to 14j). Thereby, the cylinder core is axially shiftable and pivotably assembled within the cylinder housing wherein a longitudinally shiftable cam at the cylinder core interacts with the adjustable blocking element in order to configure said blocking element axially shiftable to the cylinder core. This longitudinally shiftable cam within the cylinder core can interact with the key within the cylinder core and can axially be moved out of the cylinder core by an insertion of the key. Hereby, the adjustable blocking element can also be axially shifted to the cylinder core. The adjustable blocking element can thereby again act on a coupling element which is mounted longitudinally shiftable to the cylinder housing. Hereby, a longitudinal guidance between the cylinder housing and the coupling element can be intended. Advantageously, a spring between the adjustable blocking element and the control element can be intended in order to be able to automatically longitudinally shift the adjustable blocking element. Further, an actuation element can be intended longitudinally shiftable within the cylinder housing which can preferably interact with a circular projection of the control element and also with the latch for the cylinder core. Thereby, the circular projection at the control element can push the actuation element against a spring force radially towards the outside into the cylinder housing wherein the actuation element releases the latch for the cylinder core (meaning the previous form-fit), wherein then the cylinder core is axially shiftable to the cylinder housing, particularly into the cylinder housing. This longitudinal shifting of the cylinder core is existent in the blocking position of the resetting block. The resetting block can be configured by the adjustable blocking element and a projection at the cylinder housing, Advantageously, at a free edge of the adjustable blocking element an L-like projection can be intended, which configures a form-fit for the blocking position of the resetting block with the projection of the cylinder housing, By a pressure on the key, the cylinder core can be axially pushed into the cylinder housing in the blocking position of the resetting block wherein the form-fit in the blocking position of the resetting block is released. Thereby, it is possible that the adjustable blocking element is likewise axially shifted and is thereby released from the projection of the cylinder housing wherein then the cylinder core is pivotably from at least one driving position into the off-position. Preferably, the adjustable blocking element comprises a free edge, particularly with an L-like offset wherein at the offset preferably a control element is assembled particularly with a leading slope which can ideally mechanically interact with the projection of the cylinder housing. Further, at least a projection at the control element can be intended for the locking bolt of the wheel lock in order to keep the coupling element in its extended position of the cylinder housing. Further, another projection at the control element can be intended with which the control element is kept between a detention of the cylinder housing in order to therewith fix the control element axially within the cylinder housing.

Further, the present invention is directed to a wheel lock for blocking a functionally essential component like for example a steering-column or a gear shift lever of a vehicle wherein the lock cylinder according to the invention can be used. Hereby, it can be further intended that at least a transponder, particularly in form of an electric coil within the area of the insertion opening of the key channel is intended wherein at least a data exchange and/or an energy transfer to the electronic component is transferable from keys. Advantageously, at least one electronic key is used in addition to the mechanic key which at least enables an electronic data transmission to the vehicle. Herewith, likewise an active or passive keyless entry to the vehicle can be realized. Further, the electric key can be used for the deactivation of an anti-theft device wherein likewise a corresponding electronic has to be existent within the key. Since the key itself comprises an energy supply in form of an energy storage (for example batter, accumulator) in order to supply the electronic with energy, this can unfortunately lead to a failure or discharging of the energy storage. To ensure that the electronic of the key can be supplied with sufficient energy during an energy failure, the transponder within the wheel lock can transfer the necessary energy to at least one electronic component of the key.

Further, it is possible within the wheel lock according to the invention that at least one rotation of the cylinder core is transferable to a control element via the resetting block for the locking bolt or the ignition starter switch.

Further, the present invention is also directed on a method for the operation of a lock cylinder or a wheel lock with at least one ignition starter switch within the vehicle according to claim 18. With this operating method according to the invention, it is intended that the following steps are existent for operating the lock cylinder:
a) a switching-on through a rotation of the cylinder core occurs by an adequate key from the off-position via at least an ACC-position or a driving position into the starting position,
b) a simple turning-back of the cylinder core via the key in the off-position, particularly in the previous ACC-position is blocked by a resetting block,
c) a manual actuation of the resetting block, particularly by an actuation of an actuation element of the resetting block, enables a released backwards-rotation of the cylinder core by the key in the off-position, particularly in the previous ACC-position.

In order that the resetting block can act, the cylinder core previously has to be turned into at least one driving position. This driving position blocks preferably the resetting rotation of the cylinder core into the ACC-position or the off-position. Further, the method according to the present invention can be used with at least one lock cylinder according to the invention or a wheel lock according to the invention.

BRIEF DESCRIPTION OF THE SEVERAL VIEWS OF THE DRAWINGS

Further features and advantages of the present invention result from the claims, the subsequent description and the drawings. Likewise, the disclosed features from the device according to the invention also serve for the method according to the invention and vice versa. In the drawings, the invention is shown in different embodiments. Thereby, the features described in the claims and the description can be essential for the invention each single by themselves or in any combination. It is shown:

DESCRIPTION OF SPECIFIC EMBODIMENTS OF THE INVENTION

In the subsequent figures, for the same technical features although in different embodiments of the invention, the identical reference signs are used.

Figure 1A:
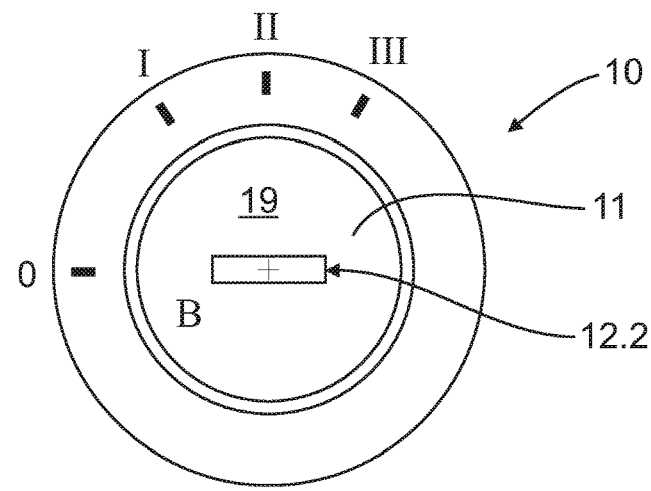
FIG. 1a a schematic top view of a lock cylinder according to the invention without a key in the off-position of the cylinder core, FIG. 1b a comparable top view from FIG. 1a on a further lock cylinder according to the invention with an inserted key in an off-position of the cylinder core, FIG. 1c a comparable top view to FIGS. 1a and 1b of a further lock cylinder according to the invention in a driving position of the lock cylinder and a ring-like actuation element for the resetting block, FIGS. 2a-d a schematic top view of a further lock cylinder according to the invention wherein the different rotation positions of the cylinder core in interaction with the resetting block are schematically indicated, FIG. 3 a schematic lateral view of a lock cylinder according to the invention with an inserted key, FIG. 4 a schematic lateral view on a cylinder core with a guidance path for the resetting block and a schematic sectional view of the resetting block, FIGS. 5a+b a schematic enlargement of the area Z from FIG. 3 for illustrating the functionality of the resetting block, FIG. 6 a cross section through the cylinder core from FIG. 7, FIG. 7 a three-dimensional view of a cylinder core for the lock cylinder according to the invention, FIG. 8 a schematic longitudinal section through a wheel lock according to the invention with an inserted key, FIGS. 9a-g a schematic lateral view on a further embodiment of a wheel lock according to the invention with a lock cylinder according to the invention in different illustrations of the cylinder core, FIGS. 10a+b a longitudinal section in the area of the cylinder core and a movable coupling element with the embodiment from FIGS. 9a-g, FIGS. 11a-f diverse sectional views of a further embodiment of a wheel lock according of the invention with a lock cylinder according to the invention in different illustrations of the cylinder core, FIGS. 12a-g diverse sectional views of a further embodiment of a wheel lock according to the invention with a lock cylinder according to the invention in different illustrations of the cylinder core, FIGS. 13a-g diverse sectional views of a further embodiment of a wheel lock according to the invention with a lock cylinder according to the invention in different illustrations of the cylinder core and FIGS. 14*a-j* diverse sectional views of a further embodiment of the wheel lock according to the invention with the lock cylinder according to the invention in diverse illustrations of the cylinder core.

In FIG. 1, a lock cylinder 10 according to the invention is shown in a top view. Hereby, the single predefined illustrations of the rotation 0 to III of a cylinder core 12 are shown which is pivotably mounted in a cylinder housing 11 of a lock cylinder 10. For this purpose, in the cylinder core 12 a key channel 12.1 is intended in which a key 14 is insertable with its key bit 14.1. Therefore, an insertion opening 12.2 for the key 14 into the cylinder core 12 is intended frontal at the lock cylinder 10. With this suitable key 14, the cylinder core 12 can be turned in at least three stable turning positions, namely the off-position 0, the ACC-position I and the driving position II. Further, another rotation position exists, namely the starting position III, which however represents an instable rotation position for the cylinder core 12 since in this rotation position a counter rotation force acts on the cylinder core 12 in order to move it back into the driving position II. As it can be recognized in FIGS. 1 and 2, normally a cylinder core 12 is turned clockwise from the off-position 0 into the subsequent rotation positions I, II and III. The reset of the cylinder core 12 from the driving position II into the ACC-position I or further in the off-position 0 is blocked by an existing resetting block 15. In order to reach the ACC-position I or the off-position 0, an actuation of the resetting block 15 has to occur via an actuation element 19 such that the resetting block 15 is transferred from its blocking position A into its releasing position B in which the cylinder core 12 can be easily actuated by a simple backward turning. In FIG. 1*a*, the cylinder core 12 at the same time serves as an actuation element 19 for the resetting block 15. In this case, the cylinder core 12 can be pushed into the driving position II in order to overcome the resetting block 15.

Figure 1B:
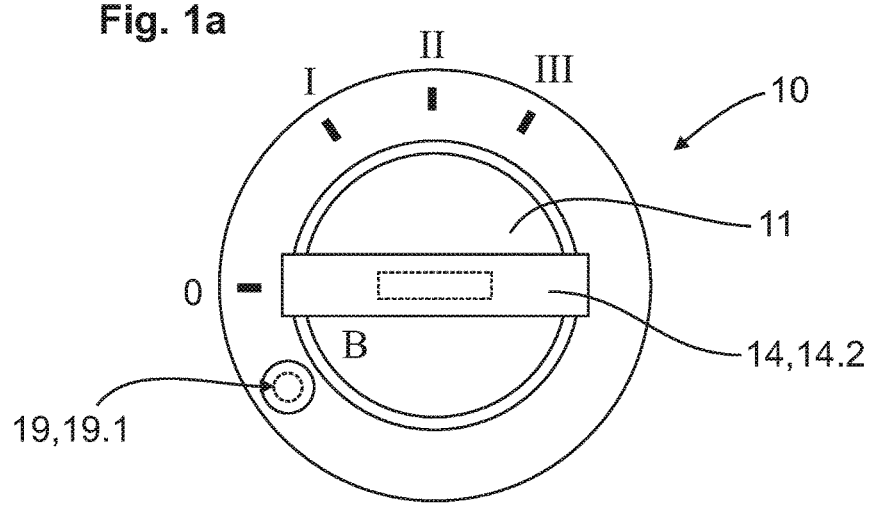
Figure 1C:
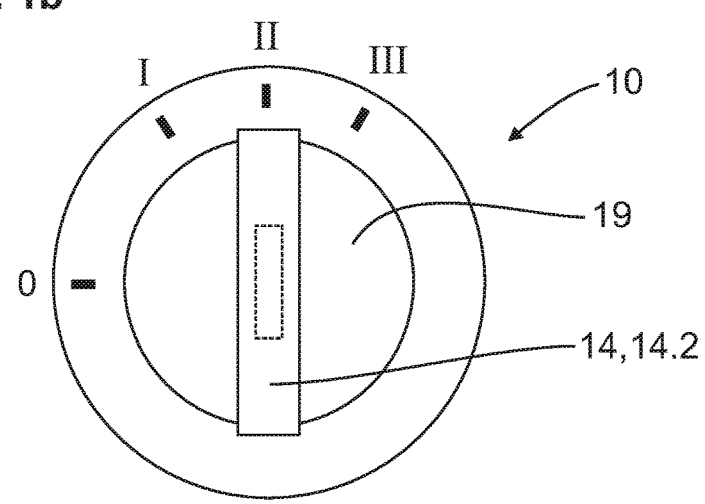

In FIG. 1*b*, the previously described actuation element 19 is intended as a knob 19.1. This actuation knob 19.1 has to be pushed in the present example in order to actuate the resetting block 15 such that the cylinder core 12 can be turned from its driving position II to the ACC-position I or even to the off-position 0 counter-clockwise by the proper key 14. In FIGS. 1*b* and 1*c*, for illustration reasons a key 14 is inserted into the key channel 12.1. In FIG. 1*b*, the cylinder core 12 is still in the off-position 0 such that although the key 14 is inserted into the cylinder core 12, a clockwise turning has not occurred yet. In this case, with a wheel lock 70 for a vehicle most electric appliances are normally turned off.

In FIG. 1*c*, differently configured actuation elements 19 for the resetting block 15 are used. Meaning, that the actuation element 19 is configured as a ring 19.2. This ring 19.2 has to be likewise pushed in order to actuate the resetting block 15. In FIG. 1*c*, the cylinder core 12 is in the driving position II such that a simple counter-clockwise turning backwards to the ACC-position I is only possible by an actuation of the resetting block 15 (meaning by pressure).

In FIGS. 2*a* to 2*d*, single turning positions 0 to III from the cylinder core 12 are shown in the cylinder housing 11 wherein at the same time the functionality of the resetting block 15 is schematically illustrated. In the embodiment from FIGS. 2*a* to 2*d*, a resetting block 15 is used which is assembled frontally of the cylinder core 12. Hereby, the resetting block 15 is assembled frontally (meaning in the area of the insertion opening 12.2) or in the back between the frontal area of the cylinder core 12 and the opposing frontal area of the cylinder housing 11. The schematically shown resetting block 15 thereby comprises a bolt-like adjustable blocking element 16 which interacts with the notch-like blocking path 17 in the blocking position A. The blocking path 17 can be intended for this purpose within the cylinder housing 11 which is stationary. The adjustable blocking element 16 can therefore be assembled at the cylinder core 12 and turns along with the cylinder core. For better illustration, in FIGS. 2*a* to 2*d* an illustration of the key 14 is left out without which however the cylinder core 12 normally is not pivotable within the cylinder housing 11.

Figures 2A, 2B:
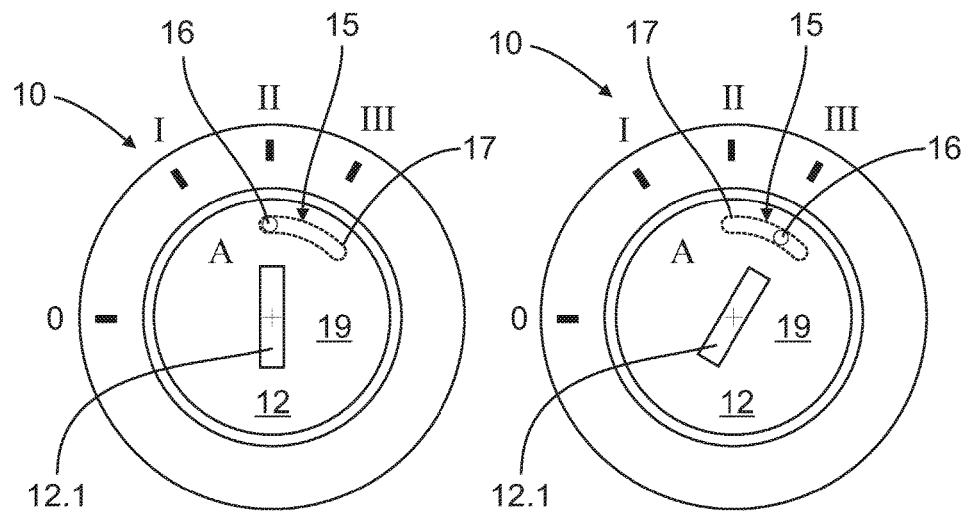

In FIG. 2*a*, the cylinder core 12 is in the driving position II. As is can be recognized from the dotted resetting block 15, the bolt-like adjustable blocking element 16 engages form-fittingly 20 into the blocking path 17. Therewith, the resetting block 15 is in its blocking position A such that an operation of the resetting block 15 becomes necessary in order to transfer the cylinder core 12 into the ACC-position I or the off-position 0.

As it can be recognized in FIG. 2*b*, the bolt-like adjustable blocking element 16 rotates along with the cylinder core 12 and correspondingly moves along on or in the circular blocking path 17. In FIG. 2*b*, the cylinder core 12 is in the starting position III which also illustrates a blocking position A of the resetting block 15.

Figures 2C, 2D:
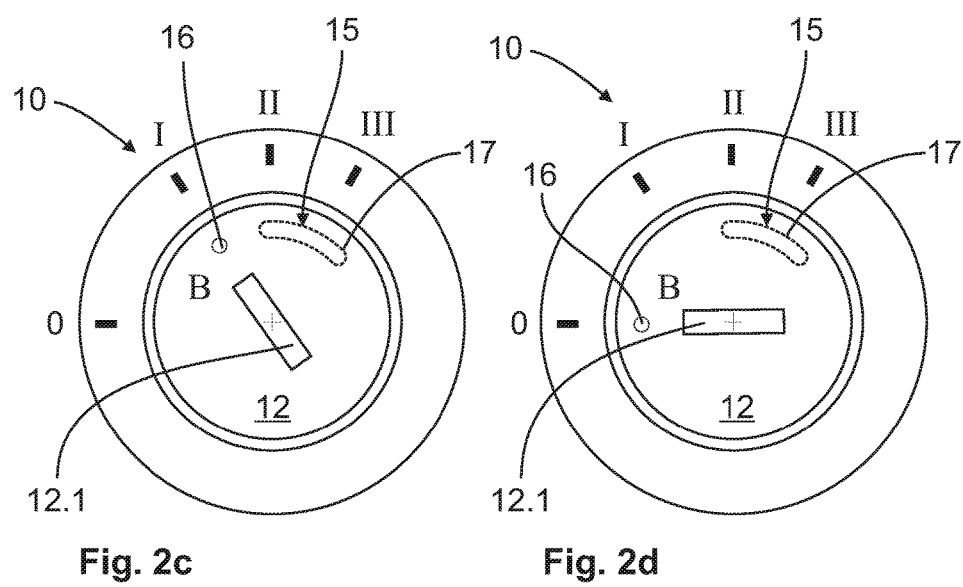

In FIGS. 2*c* and 2*d*, the respective resetting block 15 is in its releasing position B in which no form-fit 20 is established between the blocking path 17 and the bolt-like adjustable blocking element 16. In FIG. 2*c*, the cylinder core 12 is in the ACC-position I which is only reachable by an operation of the resetting block 15 from the rotation positions II and III. In FIG. 2*b*, the cylinder core 12 is in the off-position 0.

Within the scope of the invention, it is possible that a circular blocking path 17 is enlarged such that it reaches the rotation position I such that also the resetting block 15 is intended in the ACC-position I in the blocking position A. Therefore, in this case the resetting block 15 has to be actuated in the ACC-position I in order to rotate the cylinder core 12 back from the rotation position III, II or I counter-clockwise to the off-position 0.

Figure 3:
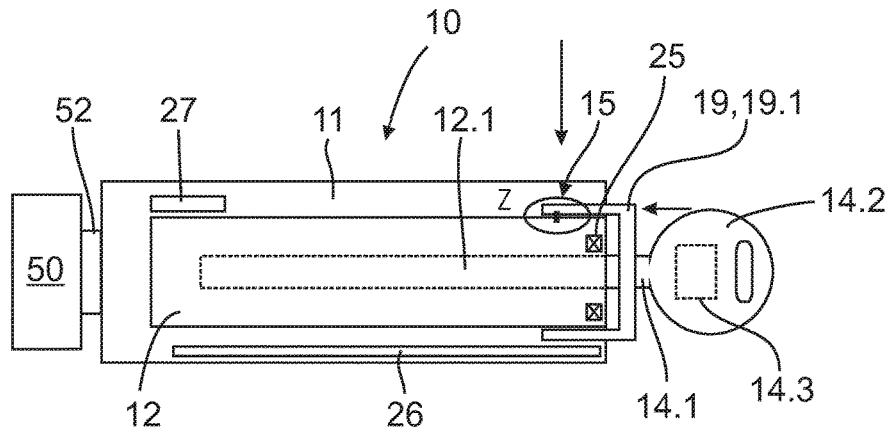

In FIG. 3, a lock cylinder 10 is only schematically shown in a lateral view. In the elliptical area Z an interaction of the blocking element 16 with the blocking path 17 of the resetting block 15 is indicated. The resetting block 15 itself comprises a circular actuation element 19.2 which can be activated by a pressure force. Likewise, the key 14 is shown with its key head 14.2 which serves for turning the key 14 and its adjacent key bit 14.1. Normally, in the key head 14.2 openings for key chains are attended. In FIG. 3, a mechanic key 14 is further used which additionally comprises at least one electronic component 14.3, preferably within the key head 14.2. This electronic component 14.3 can serve as an electronic key. The electronic key can interact with a vehicle-related security system like for example the central locking or an anti-theft device or the motor management. Further, the lock cylinder 10 comprises a transponder 25 for the key 14. Via this transponder 25 for example electric energy can be transferred from the lock cylinder 10 to the key 14 in order to be able to use the electronic component 14.3. Only schematically with the lock cylinder 10 further a blocking element for repeated starting 27 and a key detraction blocker 26 are intended. The function of the key detraction blocker 26 and the blocking element for repeated starting 27 are previously described in detail. At the lock cylinder 10, particularly frontal, an ignition starter switch 50 is assembled wherein the rotation movement of the cylinder core 12 from the lock cylinder 10 to the ignition starter switch 50 can be transferred via a coupling element 52. Therefor for example the coupling element 52 can be intended as a flange at the frontal edge of the cylinder core 12 which mechanically interacts with a counter flange with the ignition starter switch 50 (see FIG. 8).

Figure 4:
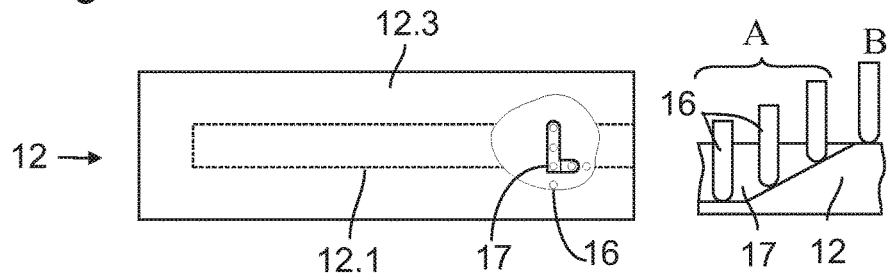

In FIG. 4, only a cylinder core 12 is shown in lateral view. Thereby, an L-like blocking path 17 is existent at the surface shell 11.1. Likewise, the possible layers of the adjustable blocking element 16 within the L-like blocking path 17 are shown in the respective blocking position A. Additionally, a releasing position B of the adjustable blocking element 16 is also shown on the outer surface shell 12.3 of the cylinder core 12 in which the adjustable blocking element 16 is not form-fittingly 20 assembled in the L-like blocking path 17. In order to be able to detract the adjustable blocking element 16 from the L-like blocking path 17, an inclined area can be assembled within the L-like blocking path 17 which proceeds from the deepest recess in the blocking path 17 to the outer surface shell (12.3) of the cylinder core 12. The slope is for example intended in a short horizontal section of the L-like blocking path 17 wherein the slope area completes into the direction of the insertion opening 12.2 facing the surface shell 11.1 (see right schematic sectional view of FIG. 4). Thus, for example the cylinder core 12 can be transferred from the driving position II into the ACC-position I by applying a pressure on the cylinder core 12 via the key 14. By this pressure, the cylinder core 12 is longitudinally shifted which means in the direction of the key channel 12.1. By this longitudinal shifting, the adjustable blocking element 16 slides on the inclined area in the L-like blocking path 17 (as shown on the right side of FIG. 4) until it reaches the outer surface shell 12.3 of the cylinder core 12. In this case, the form-fit 20 between the adjustable blocking element 16 and the blocking path 17 is released such that a further reset to the ACC-position I from the off-position 0 is possible.

Figure 5A:
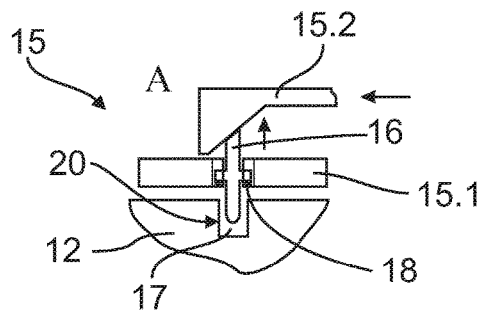
Figure 5B:
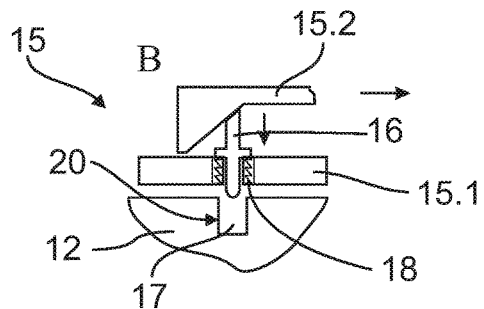

In FIGS. 5a and 5b, an exemplary embodiment of the resetting block 15 with a bolt-like adjustable blocking element 16 is shown which is assembled by a spring 18 in a stationary part 15.1 of the resetting block 15. In FIG. 5a, the resetting block 15 is in blocking position A such that the form-fit 20 is effective. Thereby, a peak of the bolt-like adjustable blocking element 16 engages with the cam of the blocking path 17. This form-fit 20 can occur by a displacement of a movable part 15.2 of the resetting block 15. This movable part 15.2 can for example be directly coupled to the actuation element 19 which only has to be pushed in order to achieve a transition of the resetting block 15 from the blocking position A into the releasing position B. This is indicated by a horizontal arrow in FIG. 5a. The pressure on the actuation element 19 thereby leads to a shifting of the movable part 15.2 wherein the adjustable blocking element 16 is moved out of the notch of the blocking path 17. For this purpose, the backward edge (the opposing edge of the peak adjustable blocking element 16) a control slope is assembled which interacts with a further counter control slope at the movable part 15.2 of the resetting block 15. By the previously described pressure to the actuation element 19, the movable part 15.2 is shifted to the left (see difference FIG. 5a to FIG. 5b) wherein the locking bolt 16 slides along the counter control slope and the movable part 15.2 of the resetting block 15. Thereby, the spring 18 pushes the adjustable blocking element 16 from the cam of the blocking path 17. The blocking path 17 can thereby be assembled at the surface shell 11.1 in the cylinder core 12 as it is displayed in FIGS. 4 and 7. As soon as the movable part 15.2 of the resetting block 15 is displaced to the right, this movable part 15.2 pushes the adjustable blocking element 16 again in the direction of the cylinder core 12 wherein a form-fit 20 is achievable.

Figure 6:
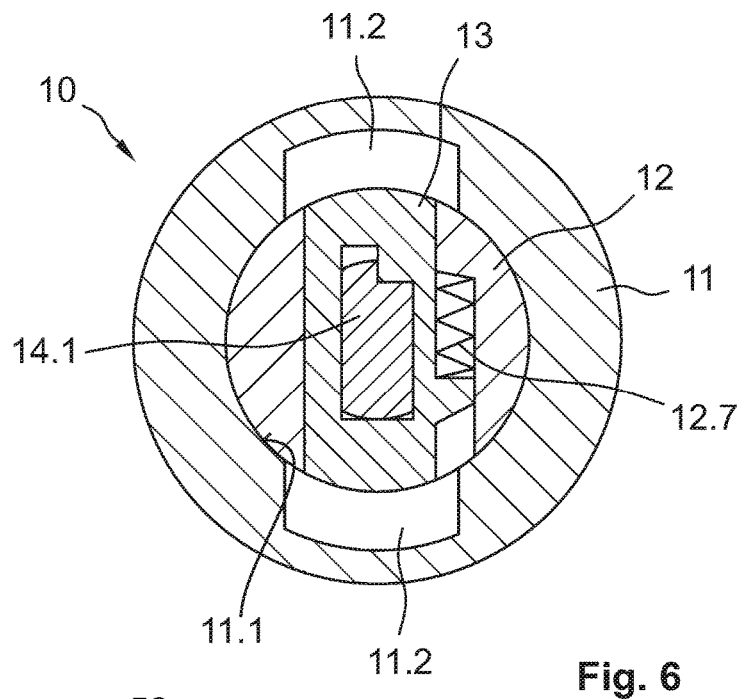
Figure 7:
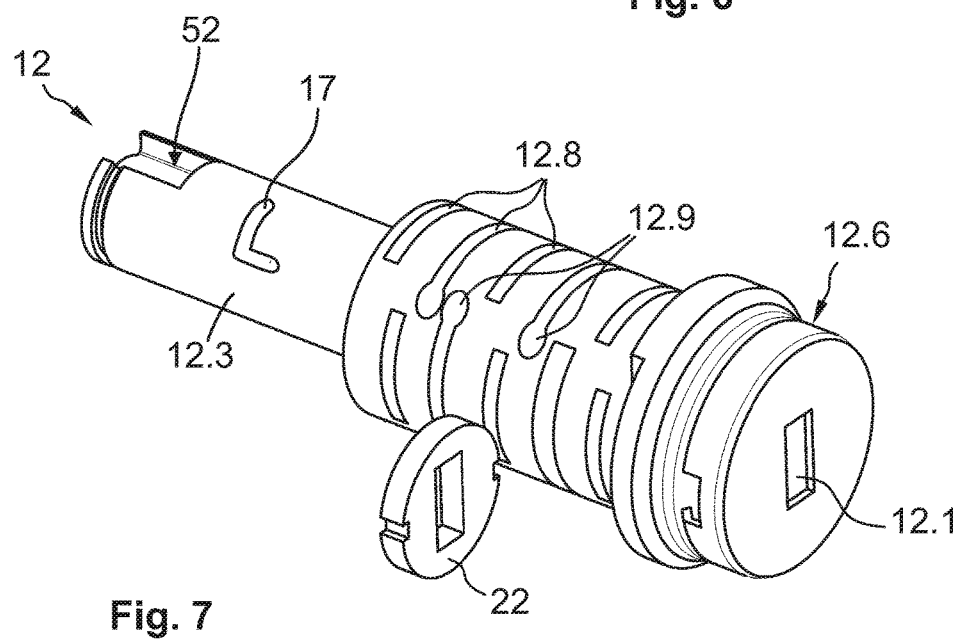

In FIG. 7, only a cylinder core 12 is shown in a three-dimensional view. Thereby, frontal at the center a key channel 12.1 is intended in the cylinder core 12 through which the single blocking members 13 are movable by the appropriate key 14 into the releasing position within the cylinder core 12 (see FIG. 6). Therewith, the blocking members 13 perform the desired movement within the lock cylinder 10, they are respectively configured with corresponding springs 12.7. The blocking members 13 are sheet-like configured with one or multiple central conducting openings for the key bit 14.1. A mounting of a sheet-like blocking member 13 occurs via the blocking member retainer 12.8. Additionally, for the springs 12.7 spring holes 12.9 can be intended in order to enable an assembling. In FIG. 7, additionally a slice-like safety element 22 which is axially symmetrical is shown with a conduction opening for the key bit 14.1 in the key channel 12.1. This safety element 22 comprises hardened material in order to provide an additional break-in protection, particularly with drilling. For the safety element 22, a retainer is intended in the cylinder core 12. Further, in the cylinder core 12 from FIG. 7 an Like blocking path 17 is only schematically illustrated. The blocking path 17 is intended in the outer surface shell 12.3 of the cylinder core 12. Further, the rear edge of the cylinder core 12 (opposing edge of the insertion opening 12.2) comprises a coupling element 52 for an ignition starter switch 50. The coupling element 52 is hereby configured as a flange with a corresponding recession notch.

In FIG. 6, a cross section through a cylinder core 12 from FIG. 7 is shown. In the cross section from FIG. 6, a sheet-like blocking member 13 is in its releasing position. In this case, it is completely assembled within the cylinder core 12. In the blocking position, the sheet-like blocking member extents in a recess 11.2 of the cylinder housing 11 which is intended in the inner shell surface 11.1 of the cylinder housing 11 wherein it can be recognized that the form-fit between the cylinder core 12 and the cylinder housing 11 exists. In order to transfer the blocking member 13 with the withdrawal of the key 14 automatically in the blocking position, the spring 12.7 is intended which is configures as a pressure spring.

Figure 8:
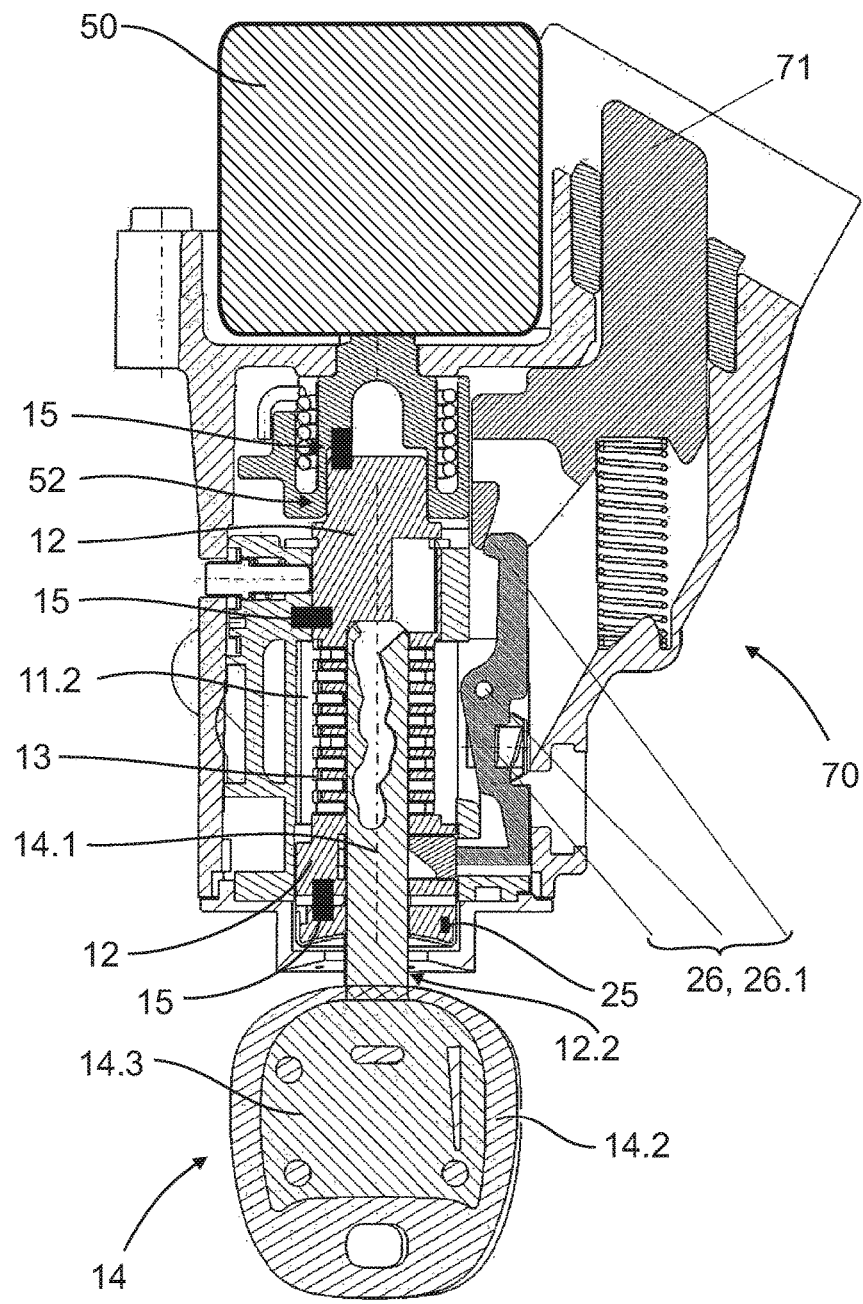

In FIG. 8, a longitudinal section through a wheel lock 70 according to the invention is shown schematically with an inserted key 14 in the key channel 12.1 of the cylinder core 12. Thereby, the wheel lock 70 comprises a locking bolt 71 for the functionally essential component of a vehicle. In the present case from FIG. 8, the locking bolt 71 is extended in order to block the functionally essential component of the vehicle. The locking bolt 71 itself is shifted back and forth by a rotation of the cylinder core 12 by a corresponding transmission element. At the same time, a rotation of the cylinder core 12 acts at the frontal ignition starter switch 50 which is likewise assembled at the opposing edge of the insertion opening 12.2. In FIG. 8, a key detraction blocker 26 is shown which is configured as a bilateral rocker lever with a turning point. This rocker lever quasi scans the key bit 14.1 and only leads to a release of the locking bolt 71 when the key bit 14.1 is completely withdrawn from the key channel 12.1. In FIG. 8, three possible positions of the mechanic resetting block 15 are shown only schematically in the lock cylinder 10 according to the invention, respectively the wheel lock 70. Thereby, the resetting block 15 is assembled preferably between the cylinder core 12 and the cylinder housing 11. The illustrated resetting block 15 in the vicinity of the insertion opening 12.2 is thereby intended frontal at the cylinder housing 12. The further optionally intended resetting block 15 at the edge of the key bit 14.1 is intended facing the surface shell between the cylinder core 12 and the cylinder housing 11. In the area of the shown coupling element 52 an optional assembly of the resetting block 15 further can occur.

In FIGS. 9a to 9g, a lateral view of a wheel lock 70 according to the invention is shown with a lock cylinder 10 according to the invention. Thereby, the single positions (0 to III) of the cylinder core 12 are shown by different rotations with the corresponding key 14. Since in FIG. 9 only one embodiment of the wheel lock 70 according to the invention is shown, the features which are subsequently described are relevant for all FIG. 9.

Figure 9A:
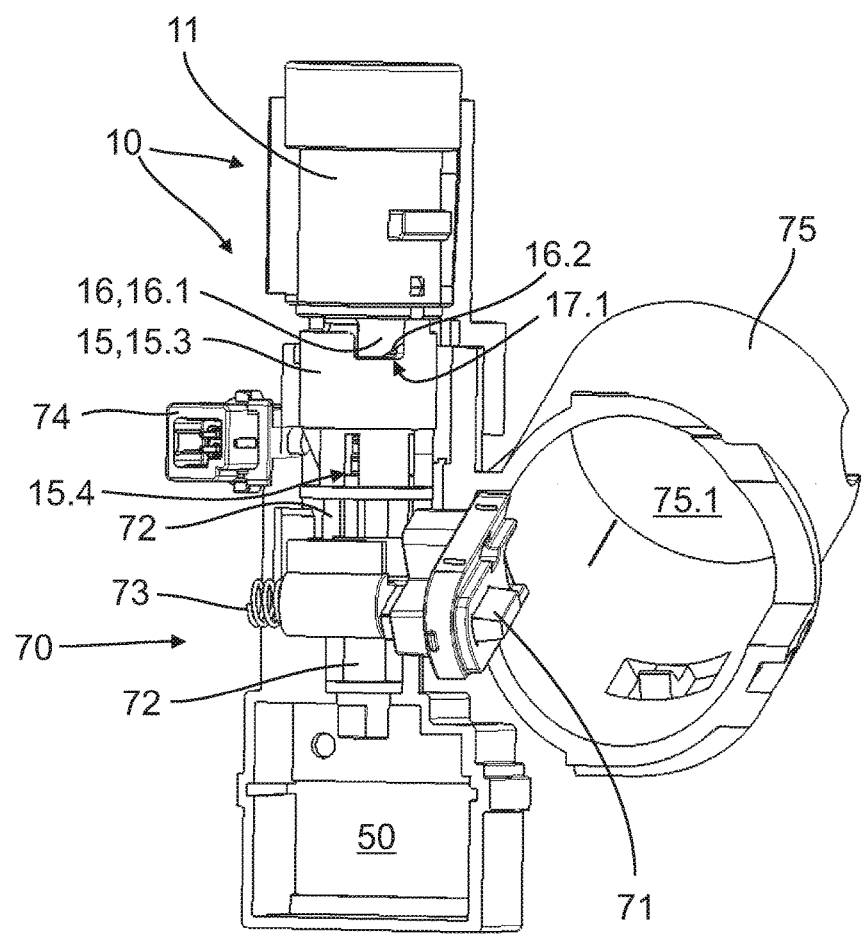

In FIG. 9a, the wheel lock 70 is shown without a key 14. Hereby, it can be recognized that a resetting block 15 is used with a movable coupling element 15.3 wherein the relevant adjustable locking element 16 is assembled stationary towards the cylinder housing 11 of the lock cylinder 10 in the area of the outer extent. The adjustable blocking element 16 is configured in form of a cam 16.1 with a control element 16.2 in form of a leading slope. This control element 16 acts with a blocking path 17 of the movable coupling element 15.3 in order to establish the resetting block 15. In the present embodiment, the cylinder core 12 is torque-proof with the movable coupling element 15.3, particularly via a coupling element 52 in form of a triple-square screw or a polygon or suchlike. In this embodiment, the cylinder core 12 thereby performs no relative movement to the movable coupling element 15.3. As it can be recognized, the resetting block 15 is assembled in axial extension of the cylinder core 12 wherein at the resetting block 15 a control element 16.2 is axially attached which is connected to the movable coupling element 15.3 via a longitudinal guidance but torque-proof. This control element 72 acts mechanically to the locking bolt 71 for the functionally essential component in form of a steering-column. As it can be recognized from FIG. 9a, the locking bolt 71 is shown in its arresting position wherein it form-fittingly blocks the functionally essential component. For this purpose, a fastening means 75 is assembled at the wheel lock 70 with which the wheel lock 70 is kept in the steering-column and can be assembled. The pipe-like retainer 75.1 is therefor intended at the wheel lock 70 in which the locking bolt 71 extents in its arresting position. The locking bolt 71 itself is spring-loaded by a spring 73 which serves for the fact that the locking bolt 71 is pushed in its arresting position. In axial direction, the ignition starter switch 50 is connected to the cylinder core 12 as well as the resetting block 15 and the control element 72 which via actuator 72.1 can be actuated at the control element 72 by a rotation movement of the control element 72. This actuator 72.1 at the control element 72 is at the axial edge configured by a triple-square screw or a polygon or suchlike which interacts with the corresponding complementary configured counter actuator at the ignition starter switch 50 and is therewith stationary connected with the control element 72.

Figure 9B:
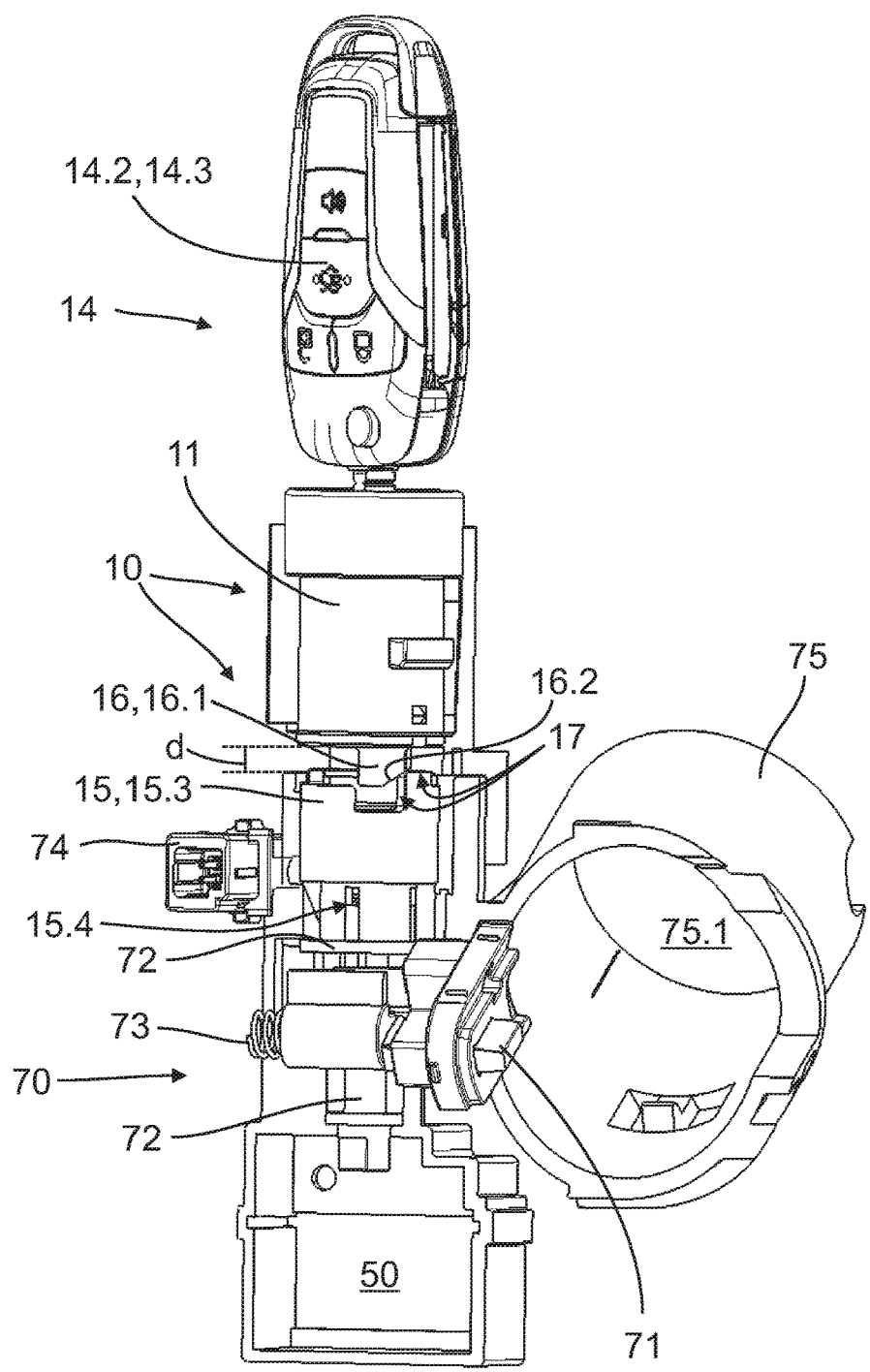

In FIG. 9b, it is shown how the key 14 is inserted into the key channel 12.1. By this insertion, a longitudinal shifting of the cylinder core 12 is generated with the help of the shifting element 23 (see here FIGS. 10a and 10b). Hereby, a distance d results between the cylinder housing 11 and the movable coupling element 15.3 which was not existent in FIG. 9a, By this axial shifting of the cylinder core 12 with the movable coupling element 15.3, the adjustable blocking element 16 separates from its offset-like recess 17.1 in the blocking path 17 of the movable coupling element 15.3. The blocking path 17 is intended frontal at the movable coupling element 15.3. As it can be recognized from FIG. 9b, the distance d affects such a moving away of the adjustable blocking element 16 from the movable coupling element 15.3 such that the control element 16.2, particularly in form of a leading slope, can now interact with an angular edge of the blocking path 17. By a rotation of the key 14 from the off-position 0 in the direction of the ACC-position I, the distance d between the cylinder housing 11 and the movable coupling element 15.3 is further increased which can be recognized from FIG. 9c.

Figure 9C:
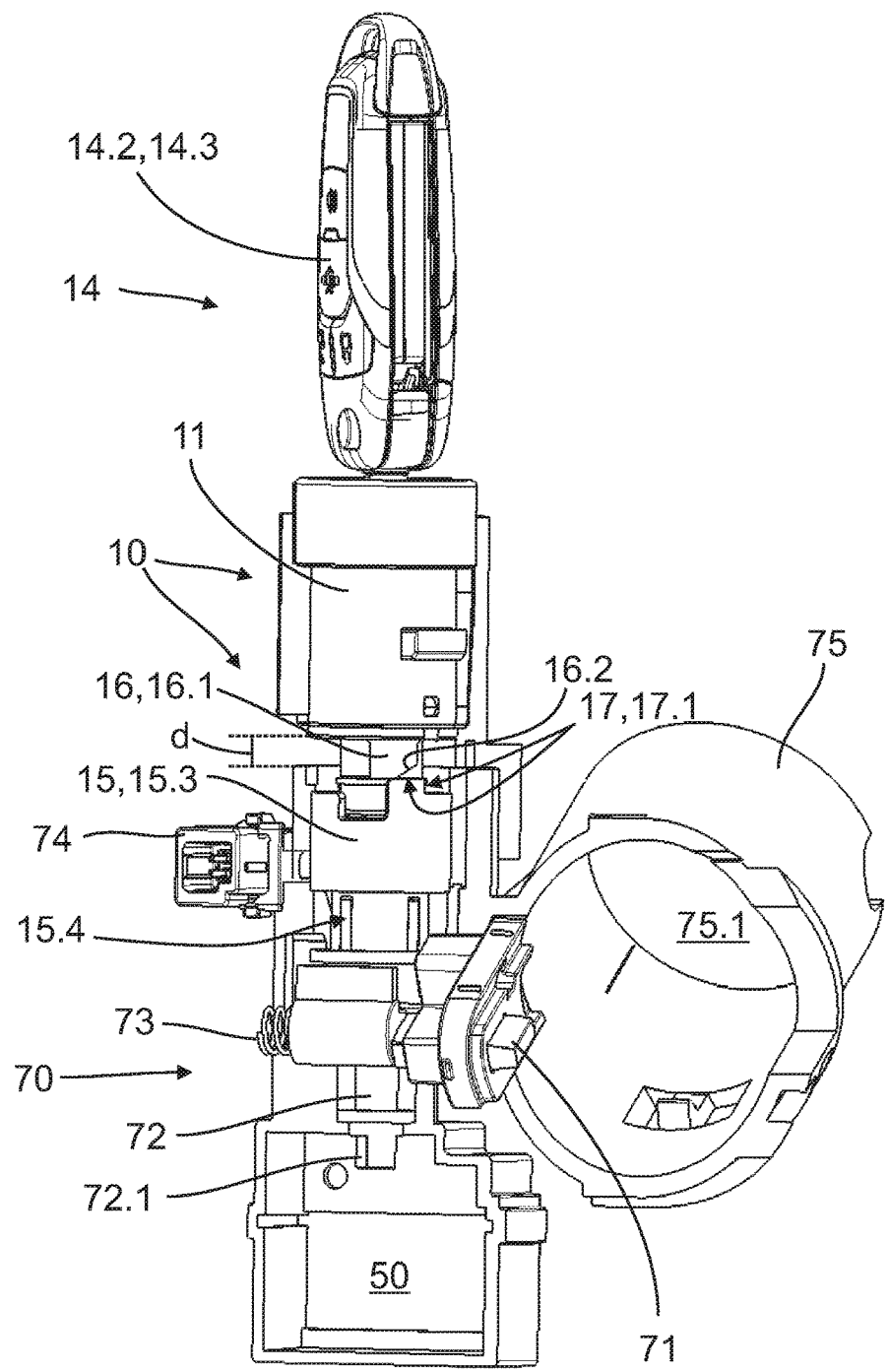
Figure 9D:
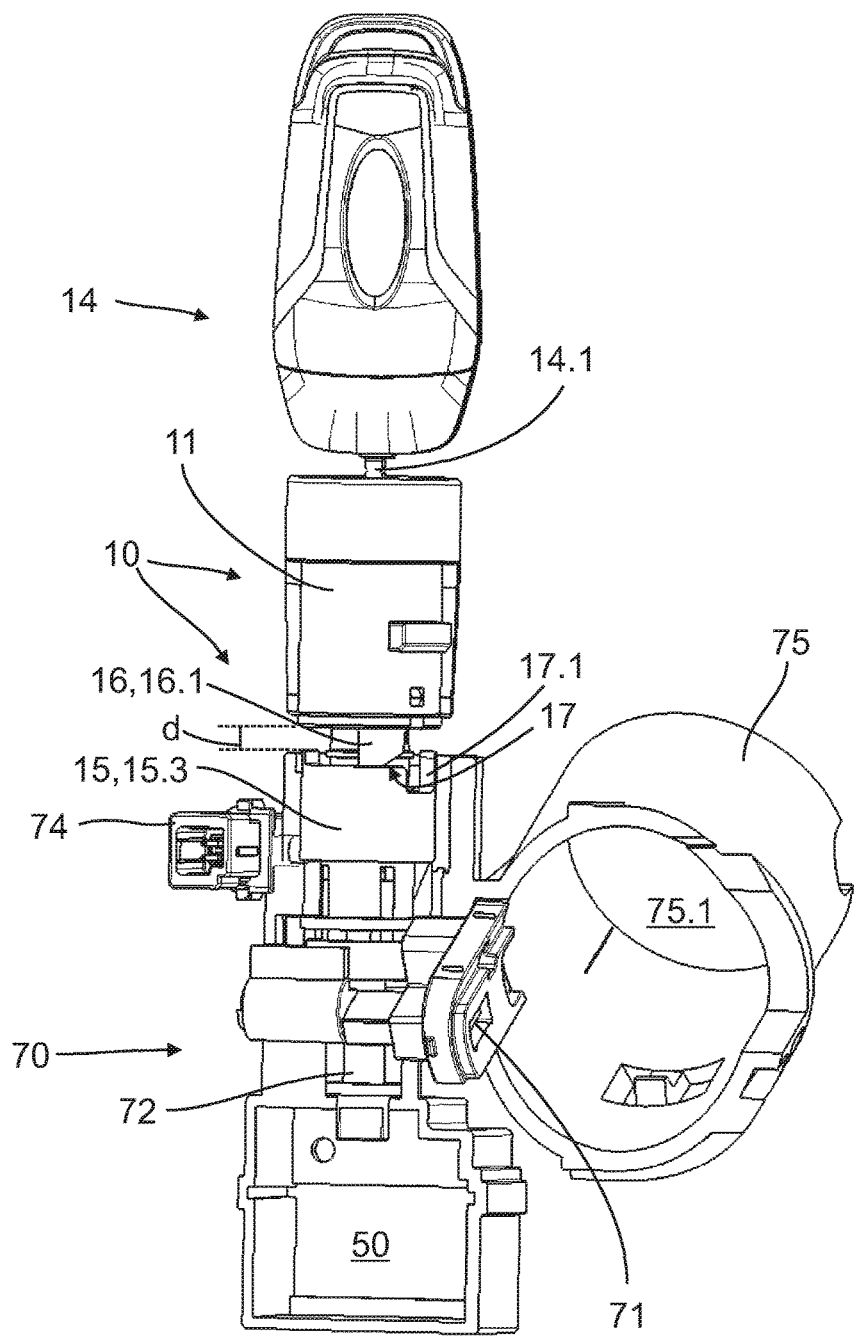

In FIG. 9c, the key 14 is turned from the off-position 0 in the direction of the ACC-position I such that now the adjustable blocking element 16 can slide along a horizontal section of the blocking path 17 with its horizontal section. In FIGS. 9a, 9b and 9c, the locking bolt 71 is further still in its arresting position wherein it can block the functionally essential component. A further rotation of the key 14 in the direction of the starting position III now effects insertion of the locking bolt 71 wherein the form-fit in the arresting position between the functionally essential component and the locking bolt 71 is released. In FIG. 9d, it can be recognized that now the locking bolt 71 does no longer extent in the retainer 75.1 for the steering-column. Hereby, the locking bolt is transferred to the control element 72 by a further rotation of the cylinder core 12 by the movable coupling element 15.3. At the same time, this movement of rotation is also transferred from the control element 72 to the ignition starter switch 50. In FIG. 9d, the cylinder core 12 is shown in its starting position III.

Figure 9E:
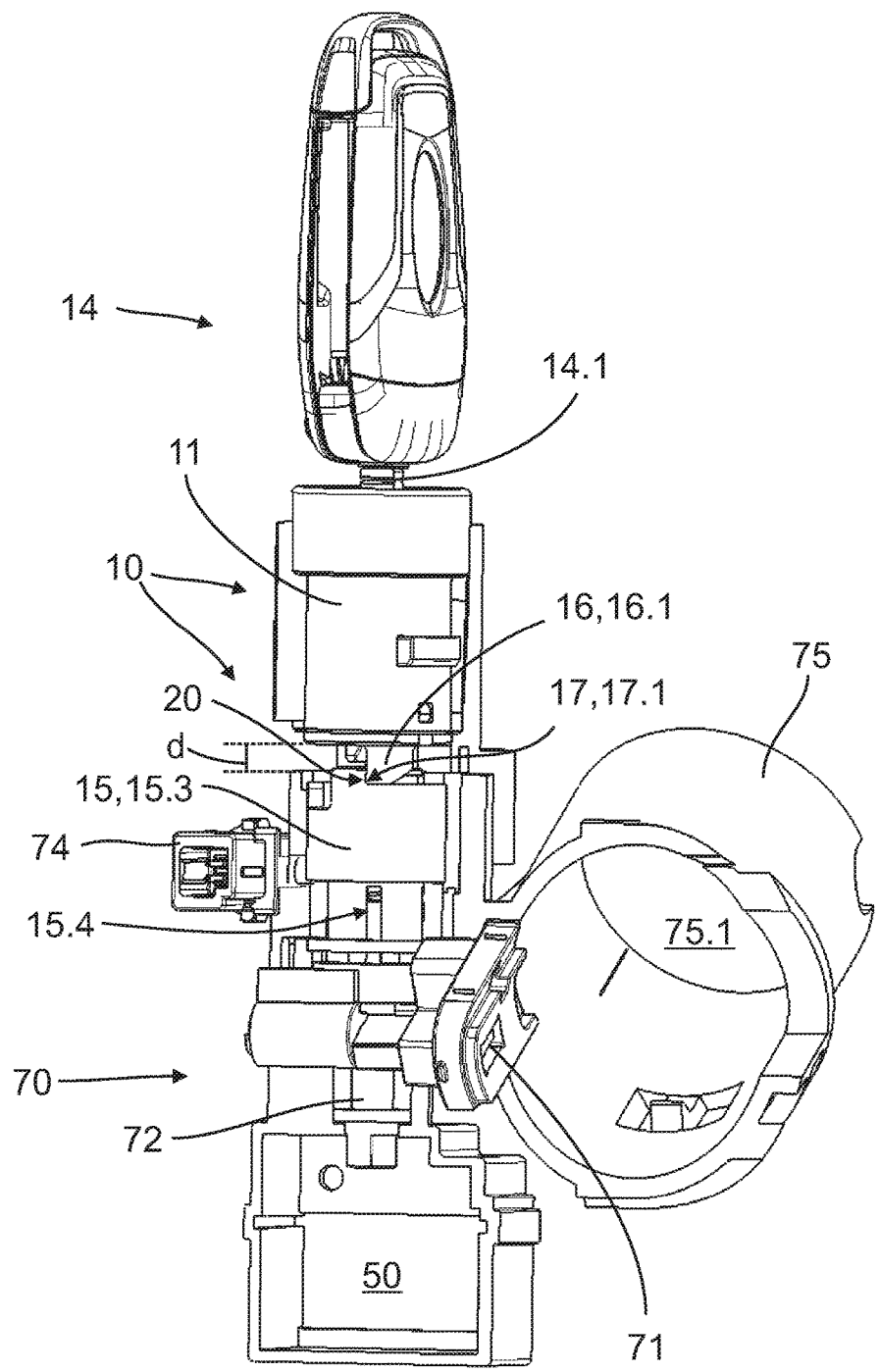

In a further FIG. 9e, a backward rotation of the cylinder core 12 from the spring-loaded starting position III into the direction of the driving position II occurs. In FIG. 9e, the cylinder core 12 is therewith in the driving position II. Thereby, the locking bolt 71 is further retracted. It can be further recognized that the offset 17.1 in the blocking path 17 now comprises a form-fit 20 with the cam 16.1 of the adjustable blocking element 16. Hereby, the resetting block 15 is assembled in the blocking position A, The resetting block 15 can only be moved from the blocking position A in case the corresponding form-fit 20 is released. Hereby, it is necessary to push the key 14 into the direction of the cylinder core 12 (meaning pushing axially) in order to affect a conscious actuation and therewith a release of the form-fit 20 of the resetting block 15.

Figure 9F:
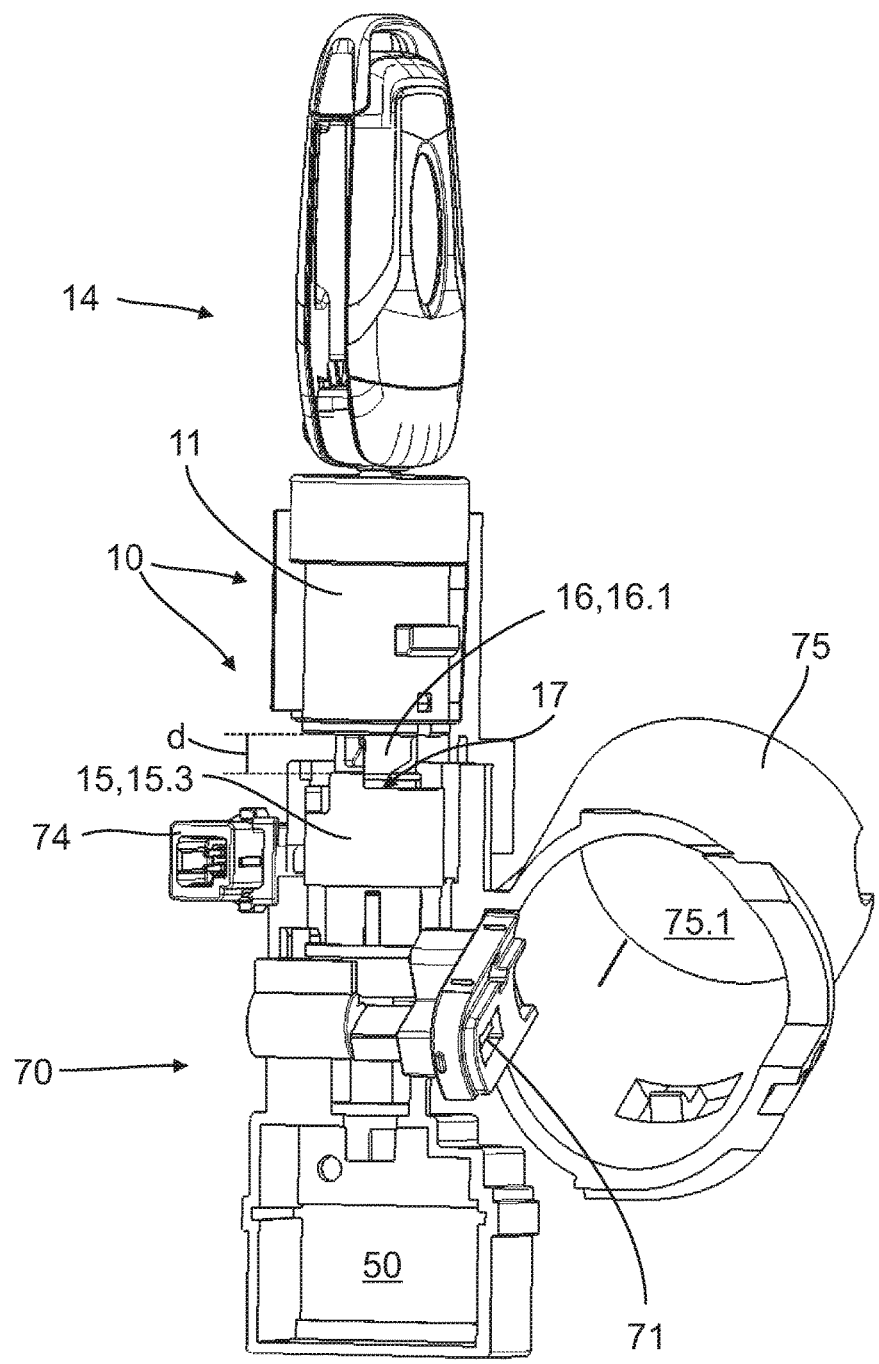

In FIG. 9f, only the pushing movement of the key 14 is shown without a rotation in comparison to FIG. 9e. Hereby, the distance d between the cylinder housing 11 and the movable coupling element 15.3 is increased in order to release the form-fit 20 between the adjustable blocking element 16 and the operating path 15.5 through the corresponding offset 17.1 at the blocking path 17. As is can be recognized, the cam 16.1 of the adjustable blocking element 16 is no longer assembled behind the offset 17.1 of the blocking path 17 of the movable coupling element 15.3 such that hereby a further rotation of the key 14 into the direction of the off-position 0 can be affected. In FIG. 9f however, the cylinder core 12 is still in the driving position II (without form-fit 20).

Figure 9G:
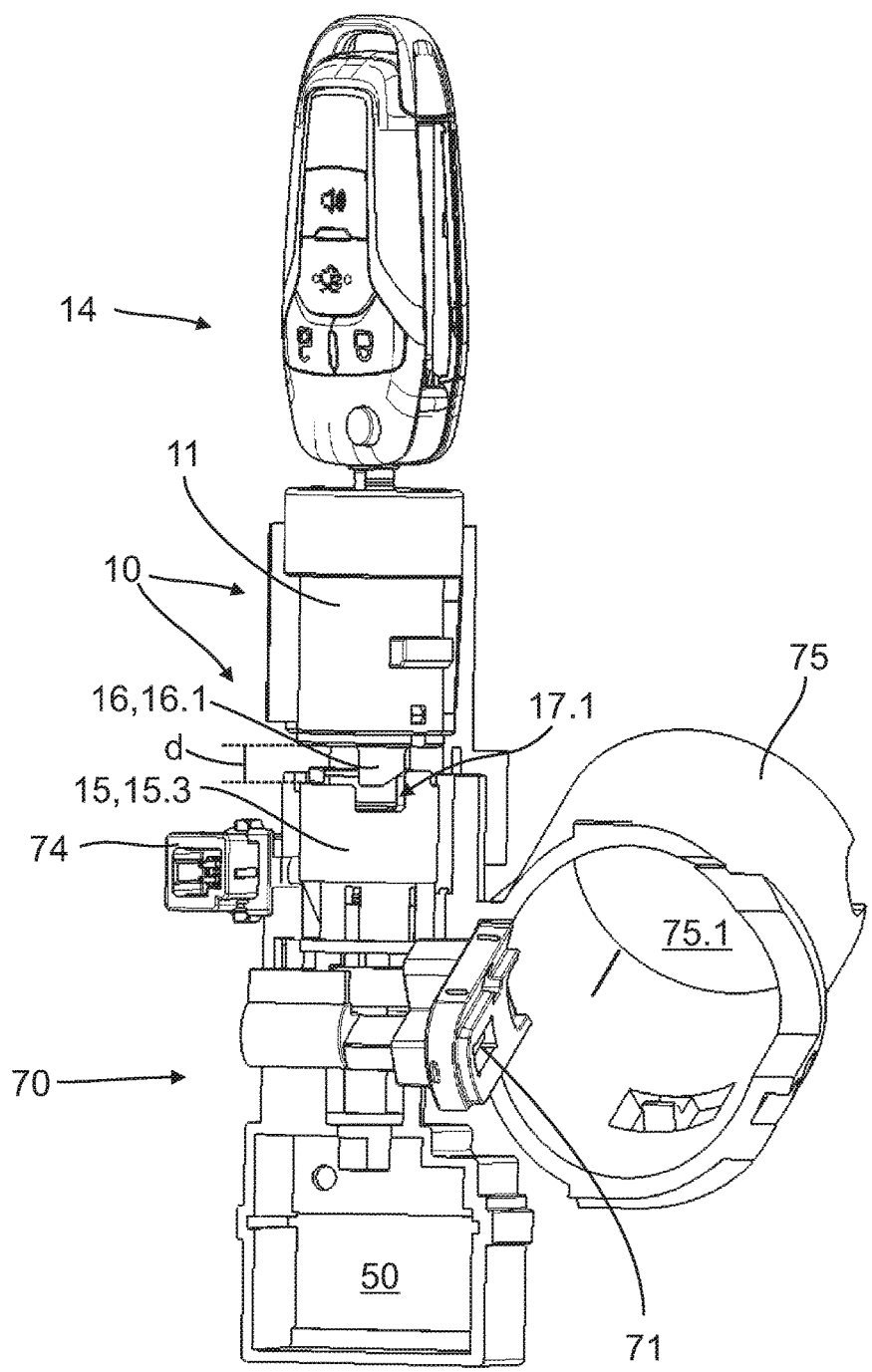

In the further FIG. 9g, then the backward rotation from the driving position II in the direction of the off-position 0 of the key 14 is shown. Thereby, the adjustable blocking element 16 initially slides along the blocking path 17 of the movable coupling element 15.3 until it can retract into the offset-like recess of the blocking path 17 which can occur by an axial longitudinal shifting of the cylinder core 12 in opposing direction of the ignition starter switch 50. In FIGS. 9d to 9g, the locking bolt 71 is further in its releasing position such that no form-fit between the locking bolt 71 and the functionally essential component exist. Therewith, the locking bolt 71 does not extent into the retainer 75.1 of the fastening means 75 of the wheel lock 70.

In order to metrologically determine the rotation position of the cylinder core 12, a position sensor 74 is intended which interacts with an operation path 15.5 of the coupling element 15.3 which can be recognized in FIGS. 9a to 9c. By the longitudinal shift of the movable coupling element 15.3 and the rotation a rotation position of the cylinder core 12 can be reliably determined by the position sensor 74.

Figure 10A:
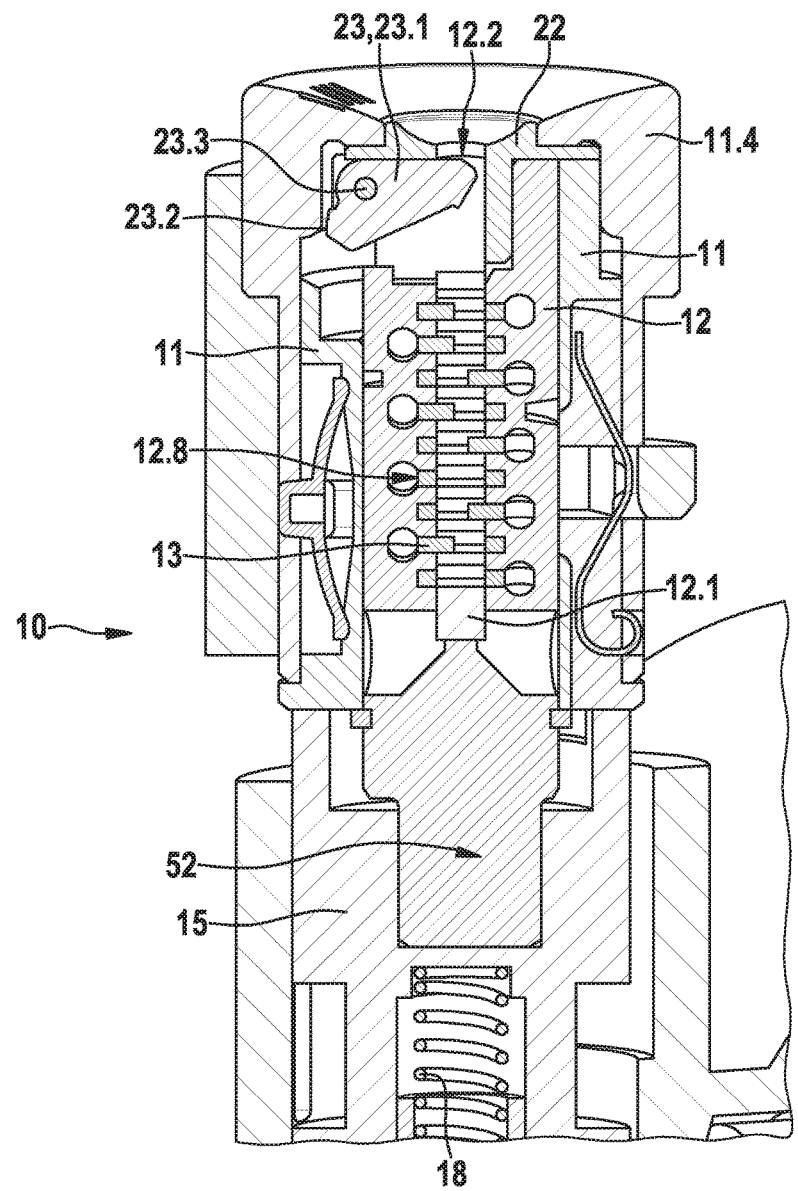
Figure 10B:
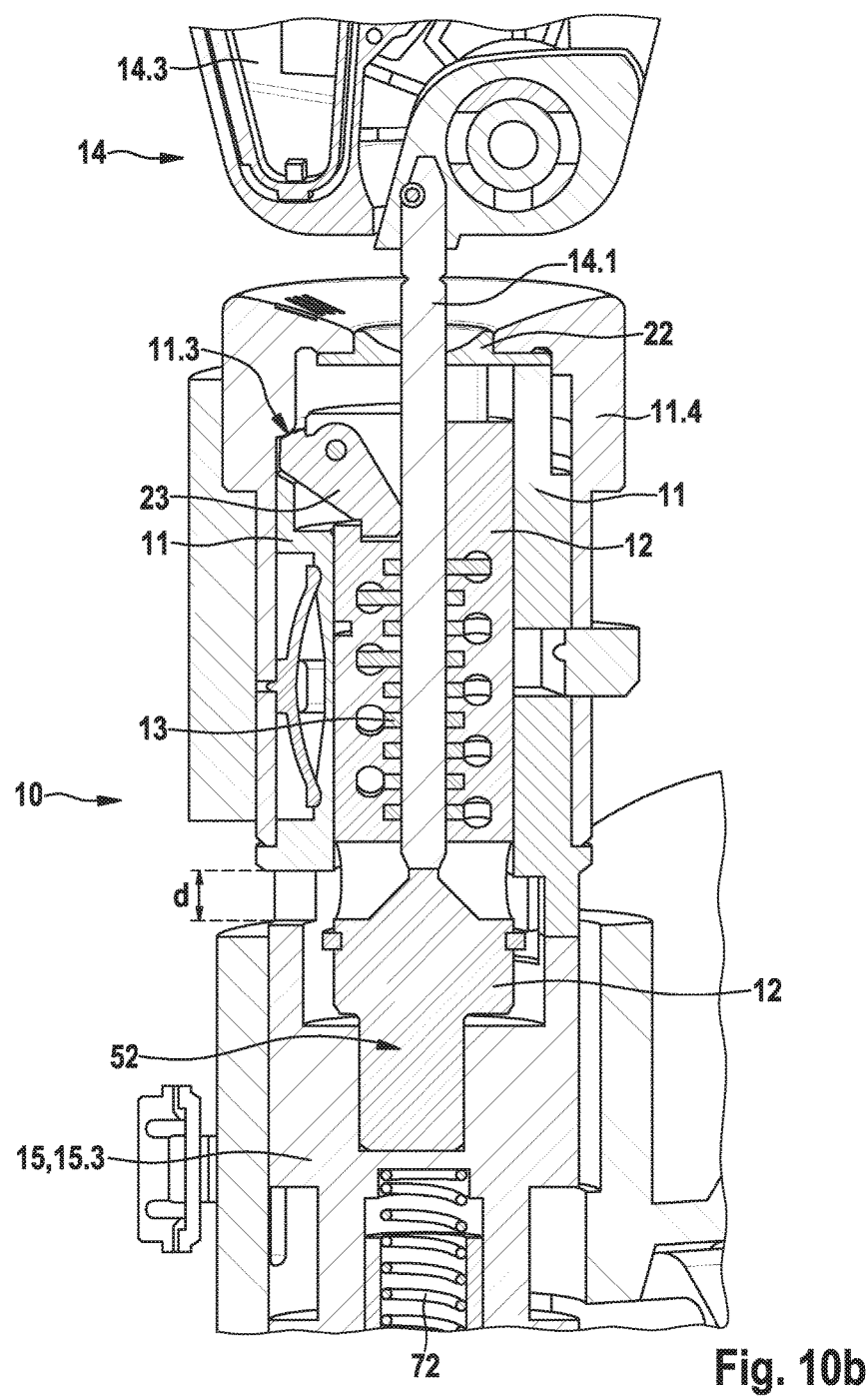

In the further FIGS. 10a and 10b, a longitudinal section through the wheel lock 70 according to the invention from FIG. 9 in the area of the cylinder core 12 is shown with an axially attached resetting block 15. Hereby, the functionality of the shifting element 23 is significant which is assembled about a rotation point 23.3 in the cylinder core 12. The rotation point 23.3 also provides the fastenings axis for the shifting element 23 at the cylinder core 12. Further, the shifting element 23 is mainly triangular wherein it is also configured lever-like. The shifting element 23 comprises a first section 23.1 and a second section 23.2 between which approximately the rotation point 23.3 is assembled. In order to achieve a leverage effect, the first section 23.1 is configured at least twice as long as the second section 23.2.

In FIG. 10a, initially no key 14 is inserted into the key channel 12.1 of the cylinder core 12. Therefore, the shifting element 23 is in its rest position. In this rest position, the cylinder core 12 is not axially shifted to the cylinder housing 11.

By inserting the key 14 into the key channel 12.1, a rotation movement of the shifting element 23 occurs as shown in FIG. 10b, Hereby, the key tip of the key bit 14.1 of the key 14 pushes the second section 23.2 away from the shifting element 23 wherein a rotation about the rotation point 23.3 occurs and the first section 23.1 is supported at the projection 11.3 of the cylinder housing 11. By this rotation movement, an axial shifting of the cylinder core 12 to the cylinder housing 11 is affected with the distance d. At the same time, the movable coupling element 15.3 is axially shifted with the cylinder core 12 as already described in detail for FIG. 9. Therewith, the position of the cylinder core 12 of FIG. 9b corresponds to the same of FIG. 10b and vice versa.

In FIGS. 11a to 11f, a further embodiment of the wheel lock 70 according to the invention is shown with the lock cylinder 10 according to the invention which at least comprises the cylinder housing 11 and the cylinder core 12 with the resetting block 15 which also applies for FIGS. 12, 13 and 14. Further, with the embodiment in FIG. 11 the actuation element 19 is assembled longitudinally shiftable in the cylinder housing 11 and is spring-loaded with the spring 18 which pushes the actuation element 19 towards the outside, meaning into the direction of the key 14. The actuation element 19 serves at the same time as a adjustable blocking element 16 which interacts with the control element 72. Therefor, at the control element a circular projection 72.3, particularly with an Like offset, is intended which projects radially towards the outside. In the present embodiment from FIG. 11, the resetting block 15 is configured by the adjustable blocking element 16 with the circular projection 72.3 of the control element 72. Further, with the wheel lock 70 according to the invention, an automatic key detraction blocker 26 with a gear 26.3, particularly in form of a lifting magnet, is existent which mechanically interacts with the blocking lever 26.1 of the key detraction blocker 26. The blocking lever 26.1 has a stationary rotation point 26.2 about which the blocking lever 26.1 is rotated through the gear 26.3.

In FIG. 11a, the key 14 is assembled in the cylinder core 12 in the off-position 0. Hereby, a resetting block 15 is assembled in the releasing position B. The cylinder core 12 itself is configured only axially pivotable in the cylinder housing 11, however not axially slidable. Further, the control element 72 is rigidly connected with the cylinder core 12 in a direct or indirect manner such that it rotates along with the cylinder core 12 wherein a torque-proof connection between the cylinder core 12 and the control element 72 has to be understood.

Figure 11B:
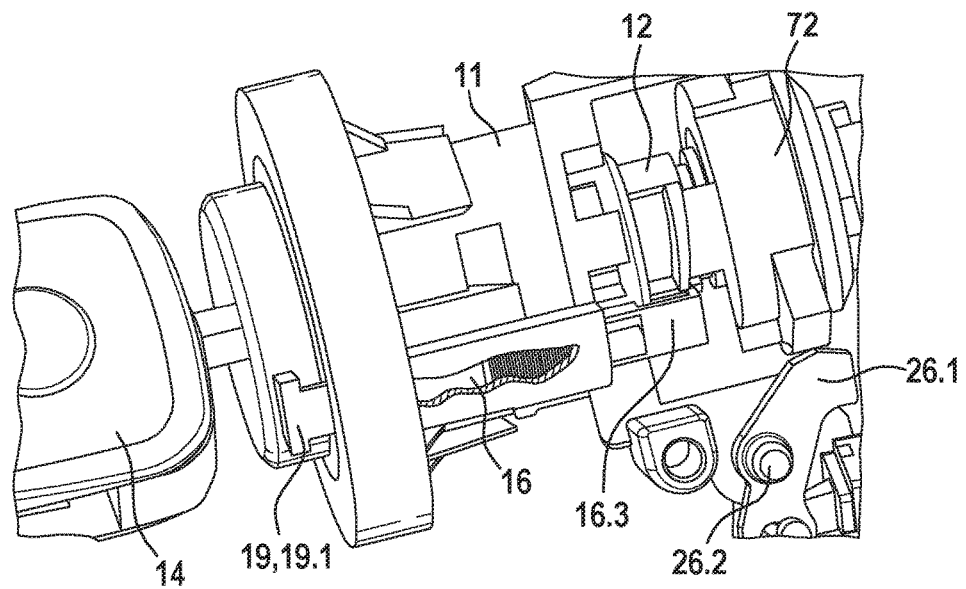
Figure 11B:
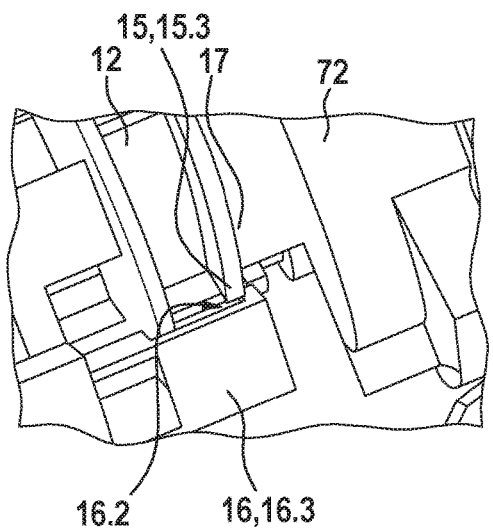

In FIG. 11b (with the corresponding enlargement on the right), the cylinder core 12 is now somewhere in the area of the ACC-position I and the driving position II wherein the resetting block 15 is still assembled in the releasing position B. As it can be recognized from FIG. 11b, the circular projection 72.3 of the control element 72 just touches the free edge 16.3 of the adjustable blocking element 16 (see right FIG. 11b as enlargement). A further clockwise rotation of the cylinder core 12 of the key 14 now affects that the circular projection 72.3 of the control element 72 is attended along the control element 16.2, particularly in form of a leading slope of the adjustable blocking element 16, wherein the adjustable blocking element 16 is pulled into the cylinder housing 11 against the spring 18. The circular projection 72.3 itself is configured with a wedge-like blocking path 7 and comprises an offset 17.1.

Figure 11C:
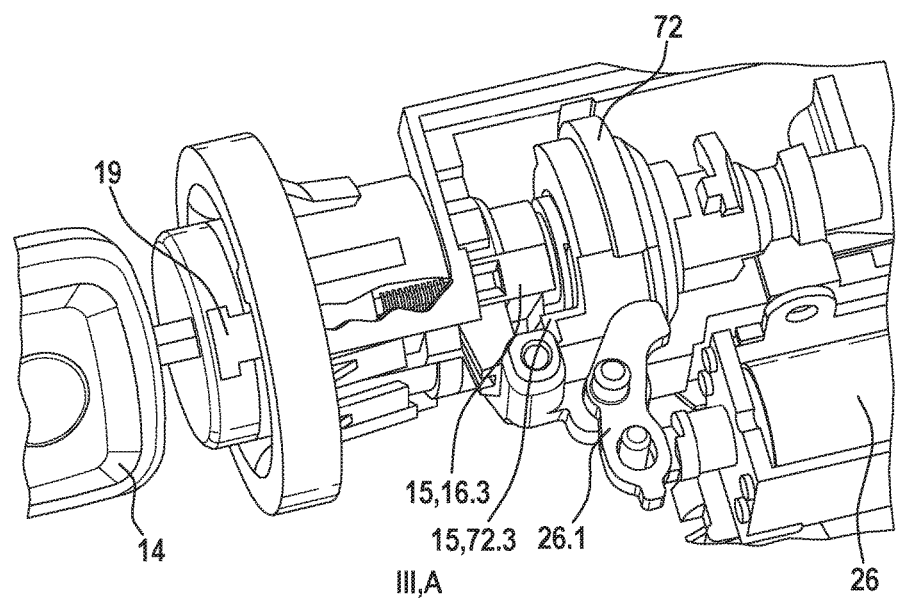
Figure 11D:
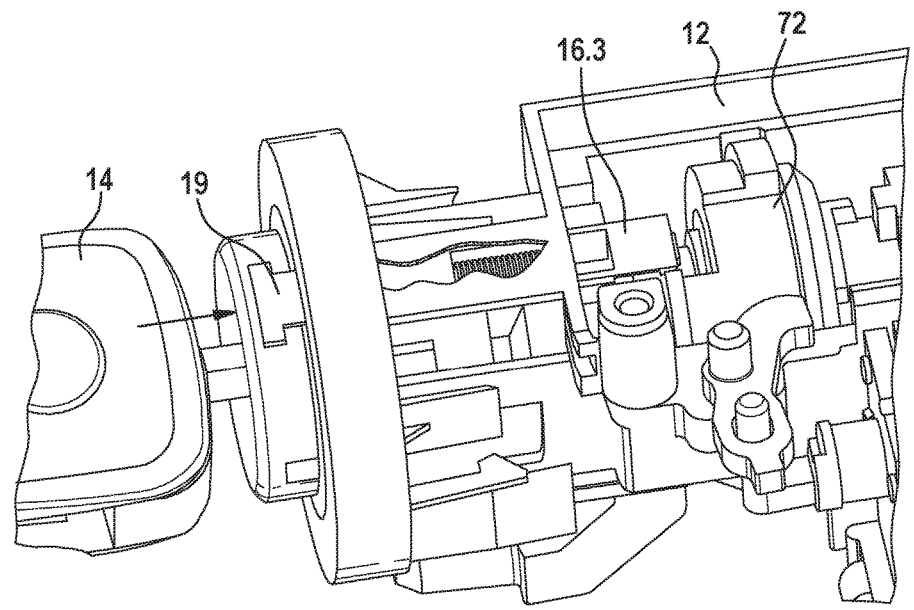
Figure 11D:
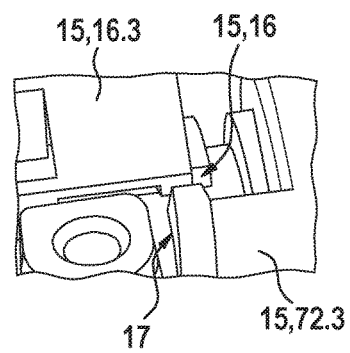
Figure 11E:
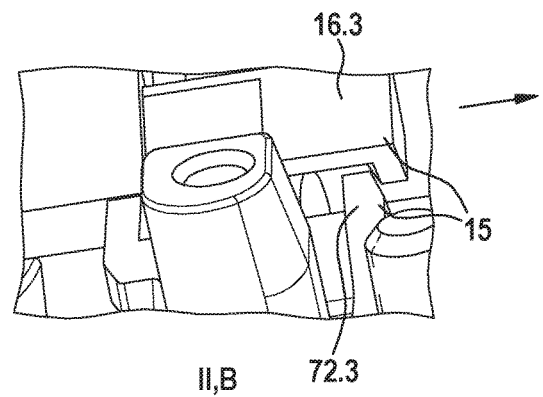
Figure 11F:
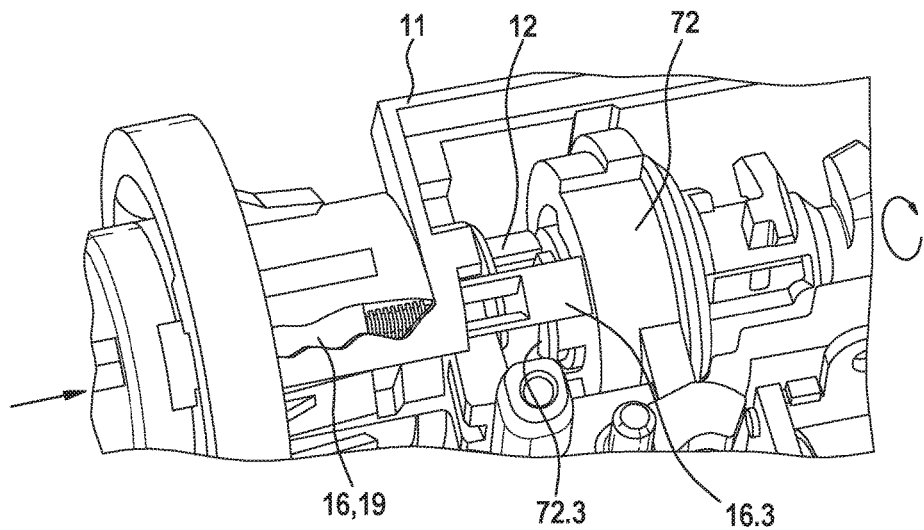

In FIG. 11c, the cylinder core 12 is rotated into the starting position III and no longer contact to the adjustable blocking element 16 by the circular projection 72.3 of the control element 72. However, the cylinder core 12 is secured by the form-fit 20 in the blocking position A of the resetting block 15 (see FIG. 11d). In this position, the actuation element 19 with the integrated adjustable blocking element 16 is driven backwards in the original position from FIG. 11a by the spring 18, meaning into the direction of the key 14 from the cylinder housing 11. As it is shown in FIG. 11d (with the corresponding enlargement on the right), the cylinder core 12 can be transferred from the starting position III into the driving position II wherein however here now the form-fit 20 is directly recognizable and a further rotation through the resetting block 15 into the ACC-position I or the off-position 0 is prevented. Thereby, now the free edge 16.3 of the adjustable blocking element 16 extents in the rotation path (counter-clockwise) of the control element 72 which rotates along with the cylinder core 12. This form-fit can only be released by a pressure on the knob 19.1 of the actuation element 19 in the direction of the arrow. Hereby, the whole actuation element 19 with an integrated adjustable blocking element 16 is pushed further and shifted further into the cylinder housing 11 such that the offset and the free edge 16.3 of the adjustable blocking element 16 releases the circular projection 72.3 of the control element 72 which can be recognized in FIG. 11b since here the longitudinal shifting of the actuation element 19 occurs by the pressure on the knob 19.1 in the direction of the shown arrow. In order to facilitate the backward rotation of the cylinder core 12 from the driving position II, additionally with the circular projection 72.3 a leading slope for the free edge 16.2 of the adjustable blocking element 16 can be intended. As soon as the circular projection 72.3 of the control element 72 overlaps with the free edge 16.3 of the adjustable blocking element 16, the form-fit 20 is released such that the blocking position A of the resetting block 15 is left and the releasing position B is reached. In FIG. 11f, the cylinder core 12 is between the driving position II which the cylinder core 12 has already left, and the ACC-position I or the off-position 0, From this position, the cylinder core 12 can be turned counter-clockwise without further problems and the actuation of the resetting block 15 can be turned counter-clockwise wherein then the spring 18 automatically pushes the actuation element 19 with the integrated adjustable blocking element 16 back into the original position as soon as the mechanic interaction with the control element 72 is no longer existing.

Figure 12A:
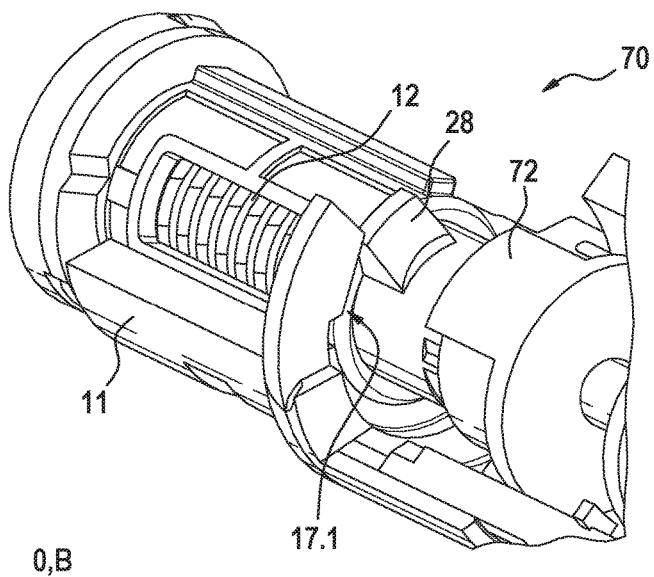
Figure 12B:
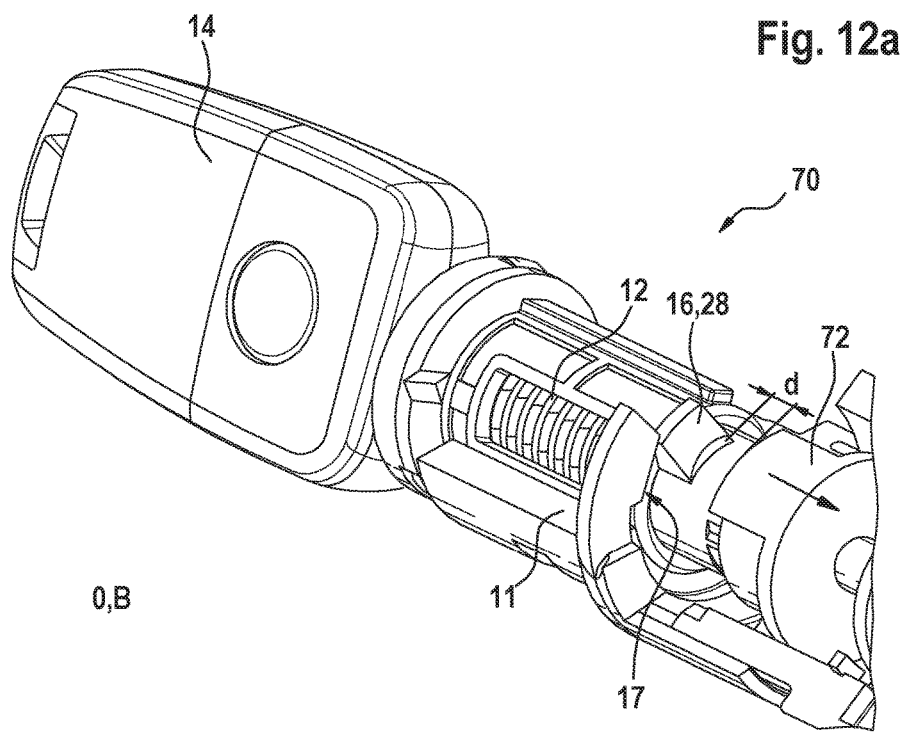
Figure 12C:
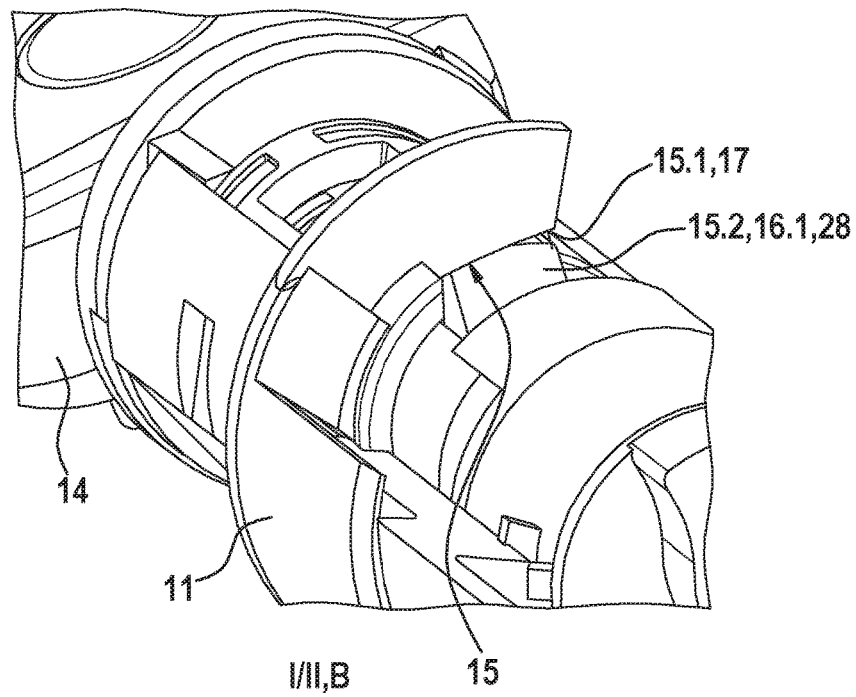
Figure 12C:
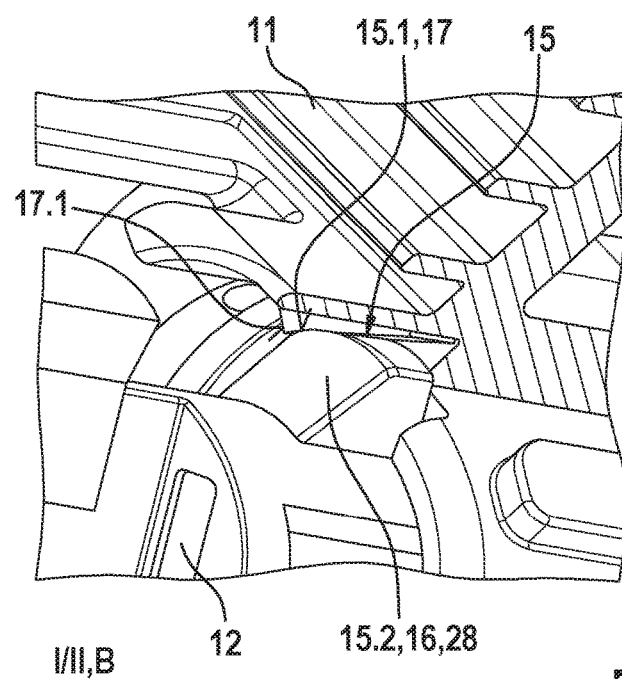

As shown in the further FIGS. 12a to 12g, a further embodiment according to the invention of the wheel lock 70 is shown with a lock cylinder 10 according to the invention. Hereby, a latch 28 acts as an adjustable blocking element 16 as a resetting block 15 in order to mechanically interact with the blocking path 17 of the cylinder housing 11 wherein the whole resetting block 15 is established. For a better overview, the wheel lock 70 is partially raised in order to better recognize the relevant components. In FIG. 12a, no key 14 is inserted into the cylinder core 12 yet such that this is in the off-position 0 and the resetting block is likewise in the releasing position B. The cylinder core 12 is axially shiftable but torque-proof connected to the control element 72 for the locking bolt 71 of the wheel lock 70. By a shifting element not shown in detail between the cylinder core 12 and the control element 72, the control element can be axially shifted to the cylinder core 12 in case that the key 14 is inserted into the key channel 12.1 until a stop position in which the cylinder core 12 can be rotated. In FIG. 12b, the inserted key 14 is shown in the off-position 0 wherein as already described the control element 72 is axially removed from the cylinder core 12 which is shown by the distance d. In FIG. 12c, the same position of the cylinder core 12 between the ACC-position I and the driving position II is shown, however only from a different perspective. The latch 28 which is normally intended for an exchange of the cylinder core 12 from the cylinder housing 11 is hereby mechanically affected by the blocking path 17 at the cylinder housing 11 in which it is radially pushed in towards the cylinder core 12. Hereby, a circular projection is attended at the cylinder housing 11 as a blocking path 17 which is radially reduced with the subsequent offset 17.1 (see right figure of FIG. 12c). The resetting block 15 is configured by an adjustable blocking element 16 in form of a latch 28 and a cylinder core 12 with the blocking path 17.

Figure 12D:
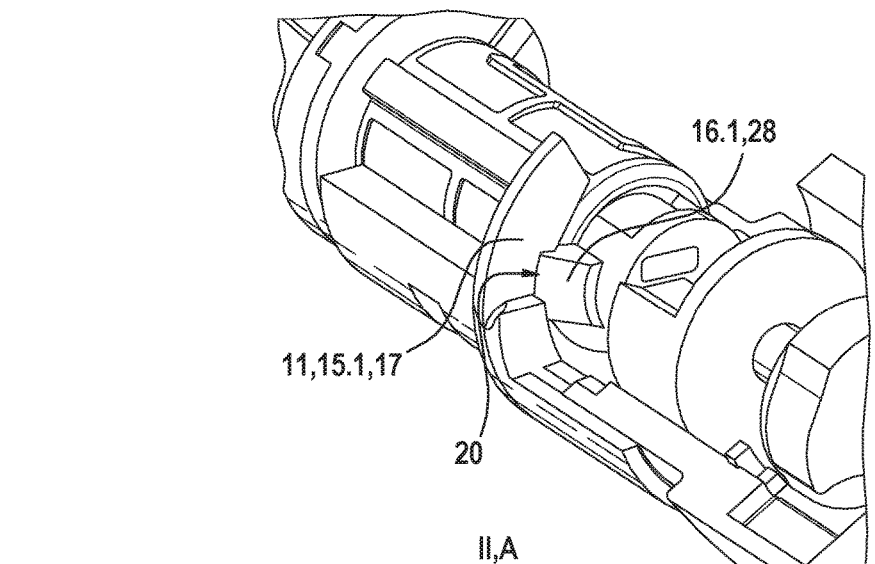
Figure 12E:
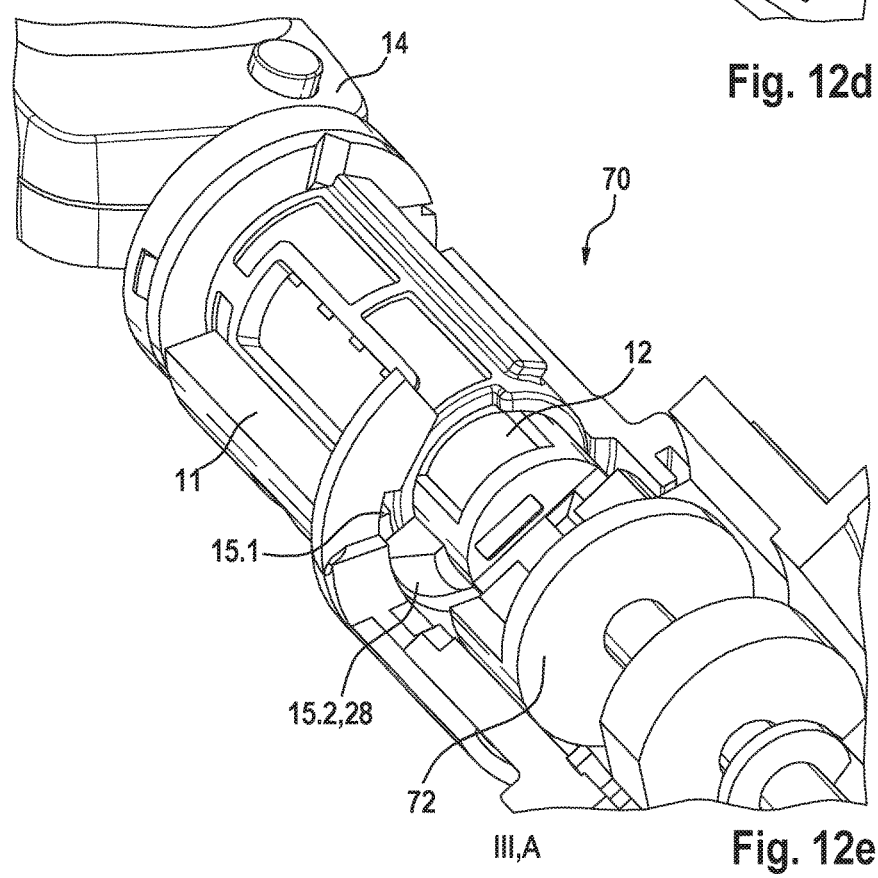
Figure 12F:
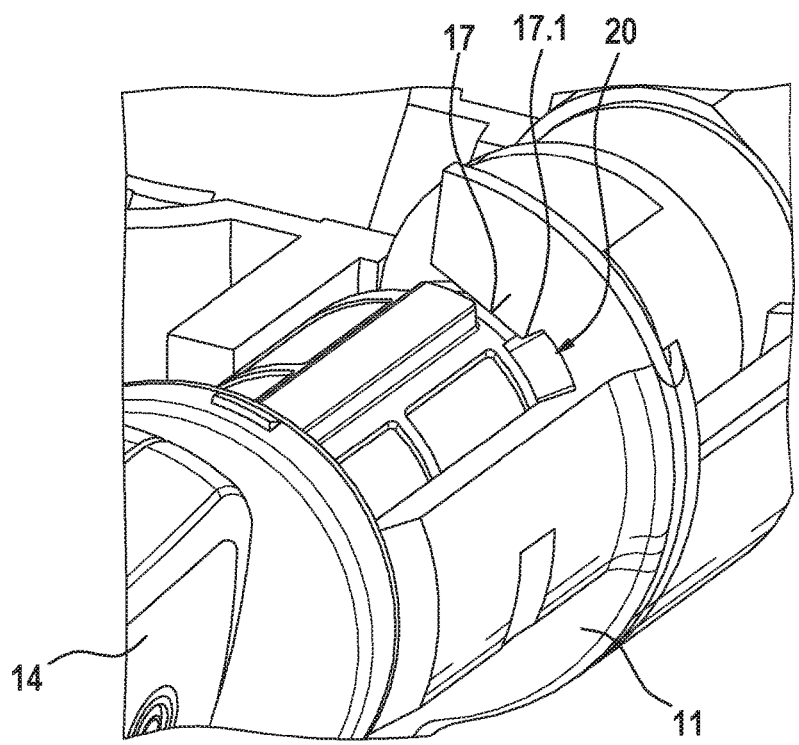

In FIGS. 12d and 12f, the resetting block 15 is in the blocking position A wherein the form-fit 20 is configured. The left and right FIGS. 12d and 12f show the identical position of the cylinder core 12 in the driving position II, however only from a different perspective. Thereby, the latch 28 is assembled form-fittingly in the recess of the blocking path 17 which is configured by the offset 17.1.

In the further FIG. 12e, the cylinder core 12 is in the starting position III which is likewise shown in a blocking position A of the resetting block 15. From this position of the cylinder core 12, it can now return into the driving position II since the existing form-fit 20 prevents a further counter-clockwise rotation of the cylinder core 12.

Figure 12G:
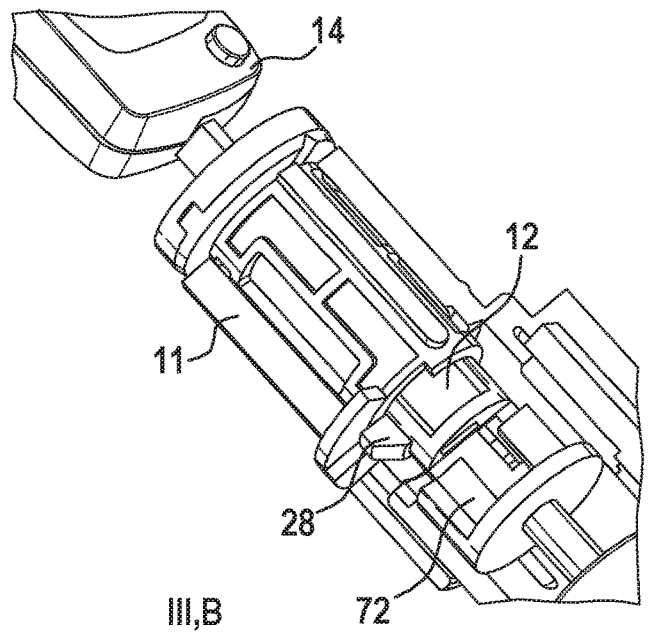
Figure 12G:
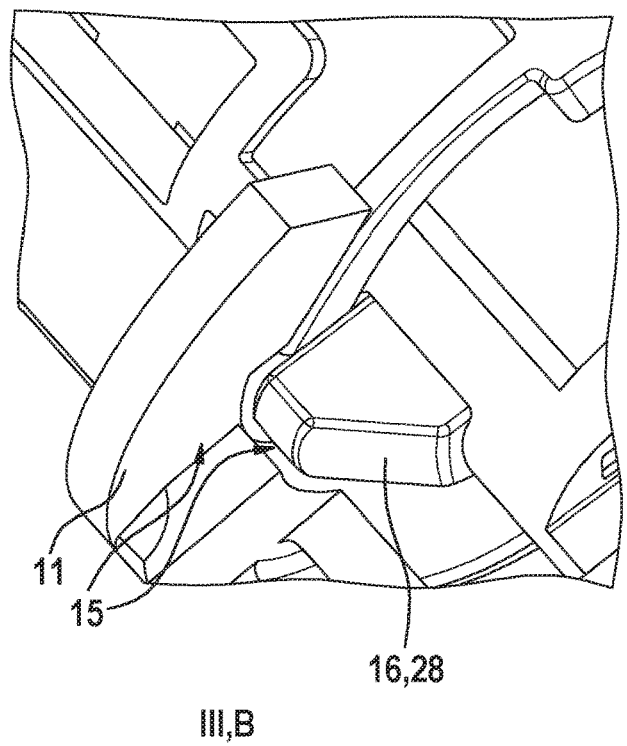

In order that the form-fit 20 can now be overcome from the blocking position A of the resetting block 15, the lock cylinder has to be pushed into the cylinder housing 11 by a key 14 wherein the whole cylinder core 12 performs an axial movement into the direction of the control element 72. By this axial movement, the latch 28 which at the same time comprises the adjustable blocking element 16 is also lifted from the blocking path 17 such that the form-fit 20 of the resetting block 15 is released and is in the releasing position B such that a backward rotation of the cylinder core 12 into the ACC-position I or the off-position 0 is enabled. In FIG. 12g, this situation is shown in detail.

Figure 13A:
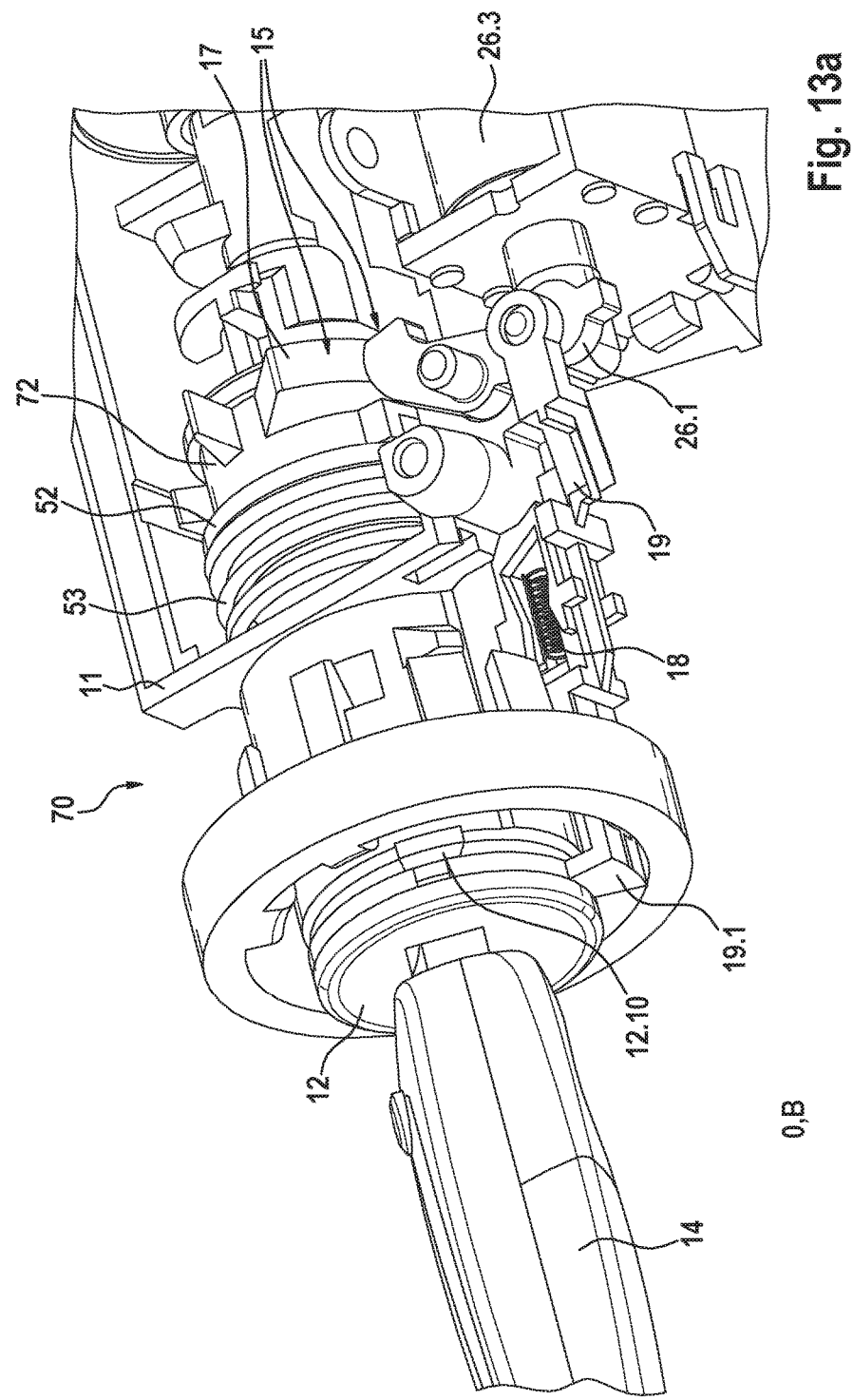
Figure 13B:
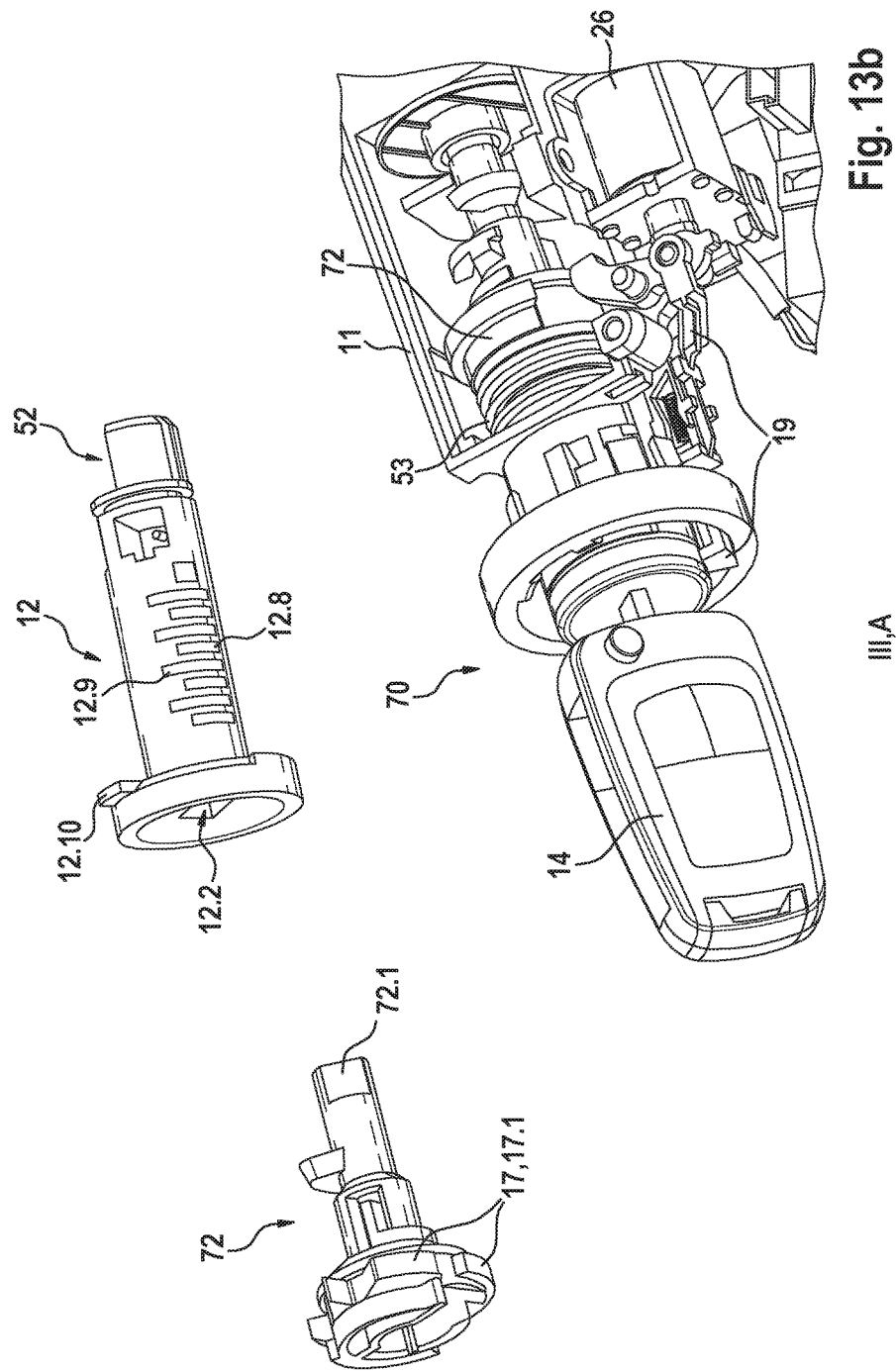

In the further FIGS. 13a to 13f, a further embodiment of the wheel lock 70 according to the invention is shown. Hereby, the existing automated key detraction blocker 26 is used at the same time as a resetting block 15 for the cylinder core 12. For this purpose, the key detraction blocker 26 comprises a gear 26.3, particularly in form of a lifting magnet which interacts with a blocking lever 26.1 and which comprises a fixed rotation point 26.2. With the open edge of the blocking lever 26.1, a blocking and therewith a rotation of the control element 72 can be affected since this possesses a radially outwardly extending blocking path 17 with a corresponding offset 17.1 which can mechanically interact with the blocking lever 26.1, In this embodiment, the automated key detraction blocker 26 can at the same time be manually actuated by the manual actuation element 19 in form of a longitudinal rod at the cylinder housing 11. Hereby, the actuation element 19 can be detracted from the cylinder housing 11 which at the same time affects a rotation movement of the blocking lever 26.1 about its rotation point 26, wherein a form-fit 20 between the blocking lever 26.1 and the blocking path 17 can be achieved at the control element 72. The pulling movement of the actuation element 19 can occur by a cam 12.10 at the cylinder core 12 which extents radially towards the outside in the blocking position A of the resetting block 15 (see FIG. 13c). Advantageously, the cylinder core 12 is axially shiftable and pivotable mounted in the cylinder housing 11 and is thereby stationary connected with the control element 12 via a coupling element 52. Wherein an additional spring 53 is intended which serves for the fact that the cylinder core 12 is pushed into the cylinder housing 11 (see FIG. 13a). In FIG. 13b, the cylinder core 12 is in the starting position III by a rotation of the inserted key 14 and the resetting block 15 is in the blocking position A by a form-fit between the blocking lever 26.1 and the blocking path 17 blocked by the control element 12. Further, in FIG. 13b the control element 72 and the cylinder core 12 are shown in technical detail. Thereby, the blocking path 17 can be recognized at the control element 72 as well as the radially extending cam 12.10 in the frontal area of the insertion opening 12.2 at the cylinder core 12.

Figure 13C:
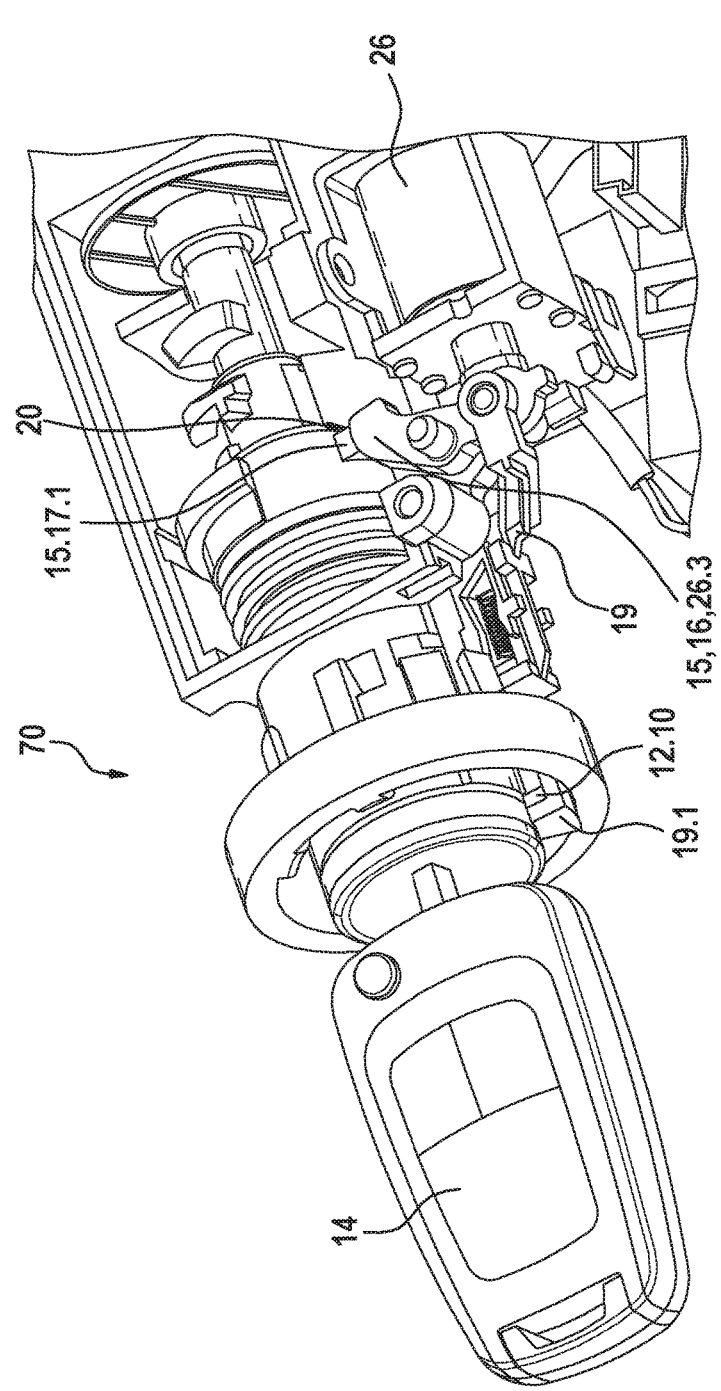
Figure 13D:
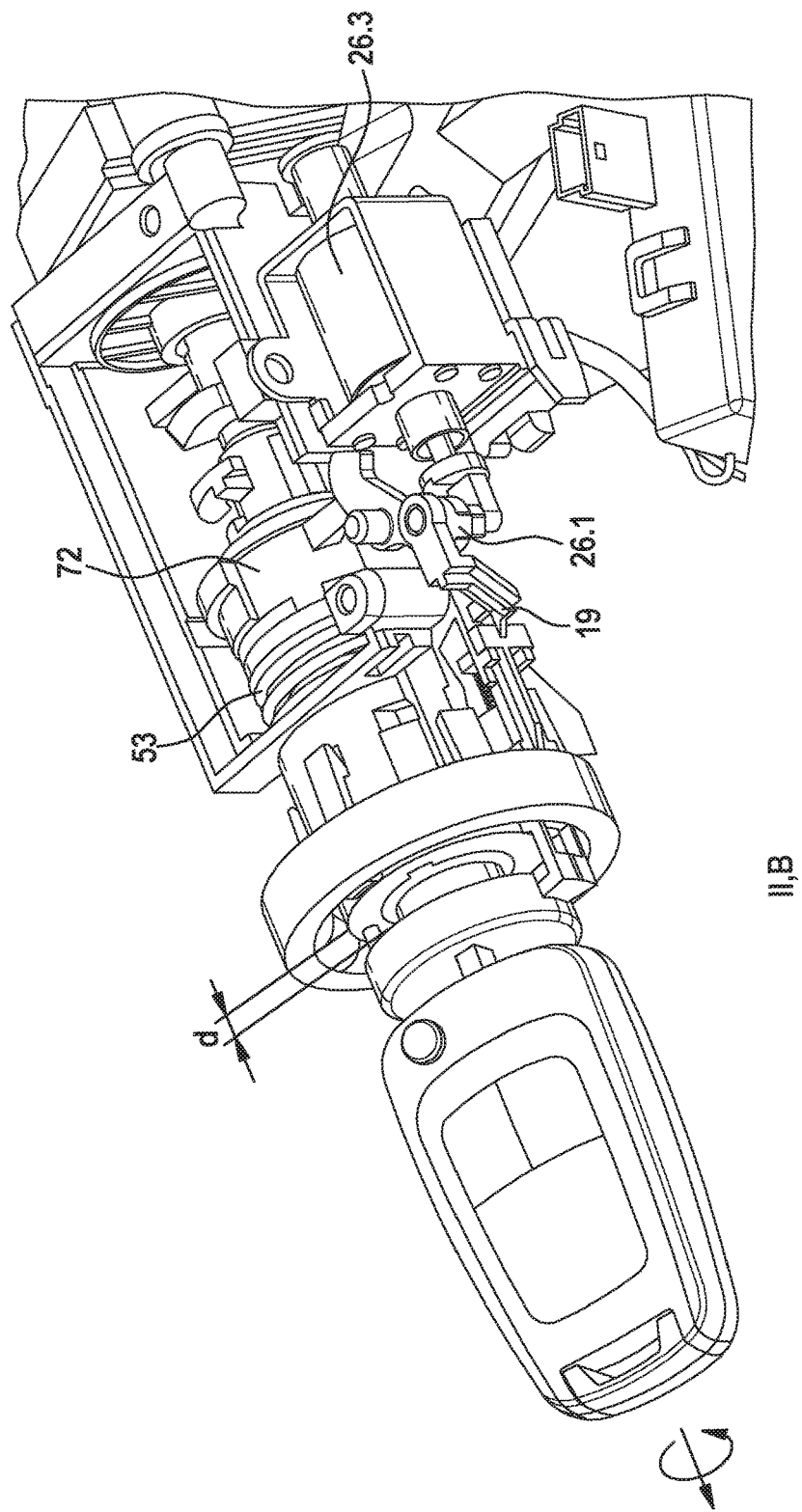
Figure 13E:
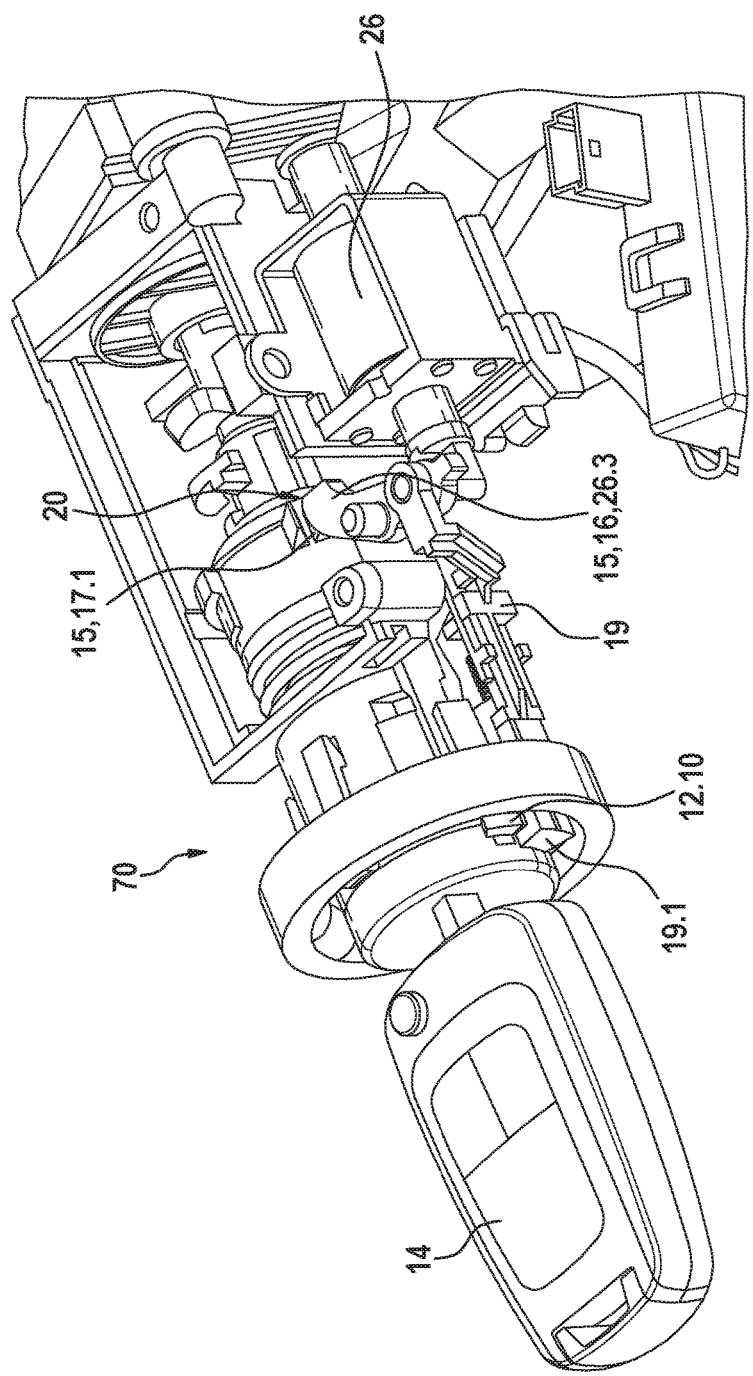
Figure 13F:
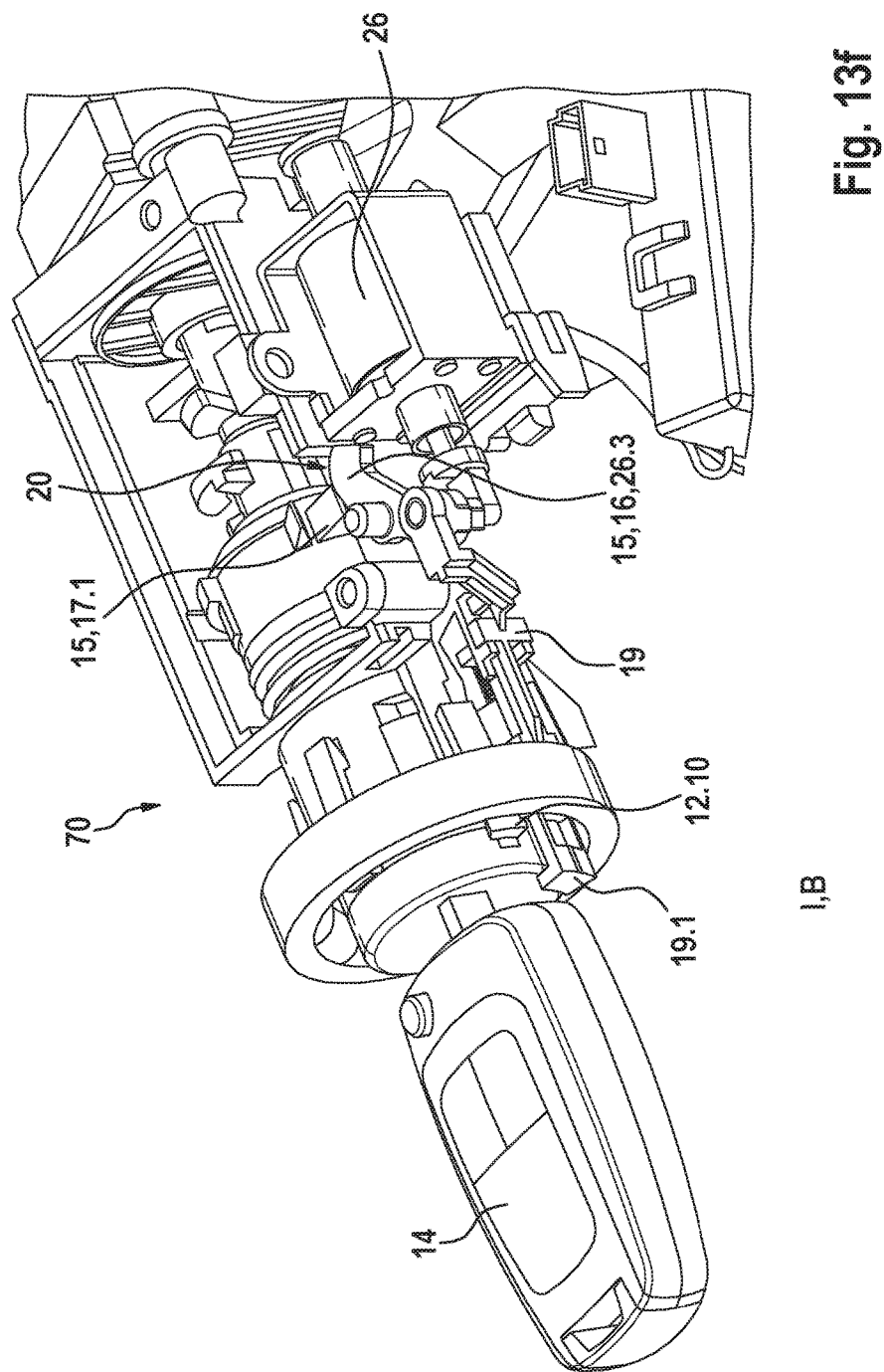

In FIG. 13c, the cylinder core 12 is in its driving position II wherein the radial cam 12.10 is retracted underneath the L-like offset of the actuation element 19 and therewith form-fittingly interacts. A pulling movement of the key 14, meaning that the key is retracted from the cylinder core 12, affects that the actuation element 19 is quasi likewise detracted from the cylinder housing 11. Hereby, the form-fit 20 of the resetting block 15 can be released which is shown in FIG. 13d wherein also the generated axial distance of the cylinder core 12 is shown. As it can be recognized, the pulling movement at the actuation element 19 affects an extension of a pestle of the lifting magnet 26.2 of the key detraction blocker 26. Hereby, the blocking lever 26.1 tilts with its free edge into the direction of the lifting magnet and therewith the blocking path 17 releases the control element 72 such that the control element 72 can be freely rotated with the cylinder core 12. In FIG. 13e, the cylinder core 12 is approximately in the ACC-position I wherein the form-fit between the radial cam 12.1 of the cylinder core 12 and the L-like offset of the actuation element 19 is released. A pulling movement at the key 14 in this case affects no further mechanic alteration in the wheel lock 70. However, in FIG. 13e it can be recognized that the automatic key detraction blocker 26 interacts form-fittingly with the blocking path 17 of the control element 72 wherein a backward movement of the key 14 in the off-position 0 is only possible when the key detraction blocker 26 is automatically operated which is shown in FIG. 13f. In this case, the locking lever 26.1 tilts with its free edge into the direction of the lifting magnet 26.3 about the rotation point 26.2. Hereby, the form-fit between the blocking lever 26.1 and the blocking path 17 of the control element 72 is released such that now the key 14 with the cylinder core 12 can be moved into the off-position 0 in order to detach the key. By the key detraction blocker 26, it can for example be achieved that the key 14 can only be detached when for example the parking break of the vehicle is active or a gear lever is in the P-position. The FIG. 13g corresponds mainly with FIG. 13a.

The pulling of the key 14 from FIG. 13d occurs against the spring force of the additional spring 53 between the coupling element 52 and the cylinder core 12.

Figure 14A:
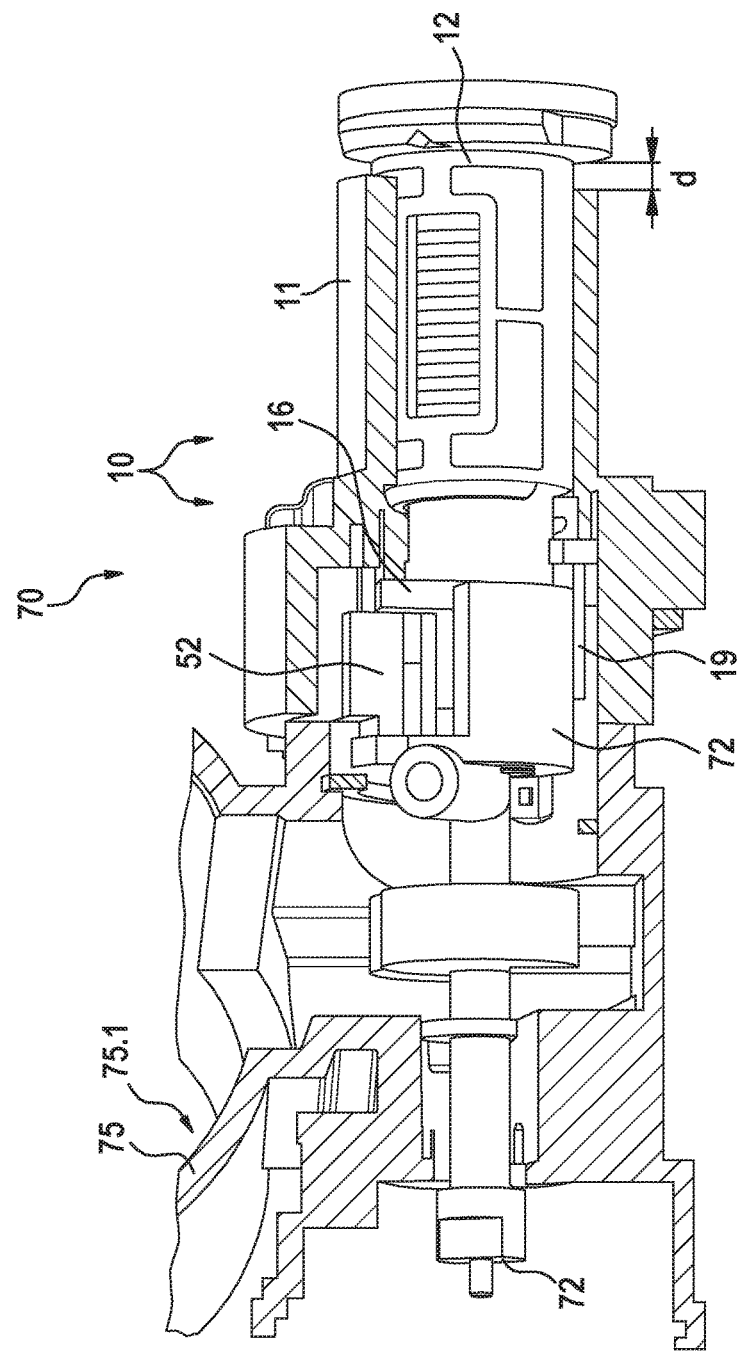

In the further FIGS. 14a to 14j, an additional embodiment of the wheel lock 70 according to the invention is shown with the corresponding resetting block 15 for the corresponding cylinder core 12. Thereby, the cylinder core 12 is axially pivotable and axially slidable in the cylinder housing 11 about the distanced (see FIG. 14a). In FIG. 14a, the cylinder core 12 is shown without key 14 in its off-position 0. The resetting block 15 is in the releasing position B. Further, the control element 72 is mounted stationary and axially slidable in the cylinder core 12. This rotation position is further shown in FIG. 14b. In FIG. 14b, the cam 12.10 of the cylinder core 12 is shown which can be longitudinally shifted by the insertion of the key 14 in the key channel 12.1. The longitudinal shifting of the cam 12.10 which is shown pestle-like in FIGS. 14b and 14c is directly transferred to the adjustable blocking element 16 such that the blocking element can be likewise axially shifted by the insertion of the key 14. The adjustable blocking element 16 hereby shifts the linearly guided coupling element 52 with its free edge 16.3 which comprises particularly an L-like offset to the cylinder housing 11 in the direction of the inserted key 14. The movement directions are shown in FIG. 14c2 by corresponding arrows. The sliding movement of the coupling element 52 is likewise transferred to the control element 52 which is initially only axially slid by the insertion of the key. The corresponding distance d of the axial sliding is shown in FIG. 14c2, In FIGS. 14c1 and 14c2, the key 14 is only inserted into the cylinder core 12 which itself is in the off-position 0. Further, at the cylinder housing 11 an outwardly movable actuation element 19 is intended which is loaded with a spring 18 and radially pressed to the edge of the cylinder core 12. This actuation element 19 acts with a circular projection 72.3 of the control element 72 (see FIG. 14e) and with the likewise intended latch 28 of the cylinder core 12. The actuation element 19 is thereby intended for initially blocking an axial shifting of the cylinder core 12 about a distance d. Only in the driving position II of the cylinder core 12 which correspondingly rotates the control element 72 along since a stationary connection in intended in between, the actuation element 19 releases the longitudinal shifting of the cylinder core 12. From FIG. 14c3 it can be seen that in the shown position of the actuation element 19 an axial shifting of the cylinder core 12 is impossible since the lower offset of the latch 28 pushes against the circular retainer of the actuation element 19. In FIGS. 14c1 to 14c3, the cylinder core 12 is still in its off-position 0 wherein in the single figures only different perspectives of the wheel lock 70 are shown.

Figure 14D:
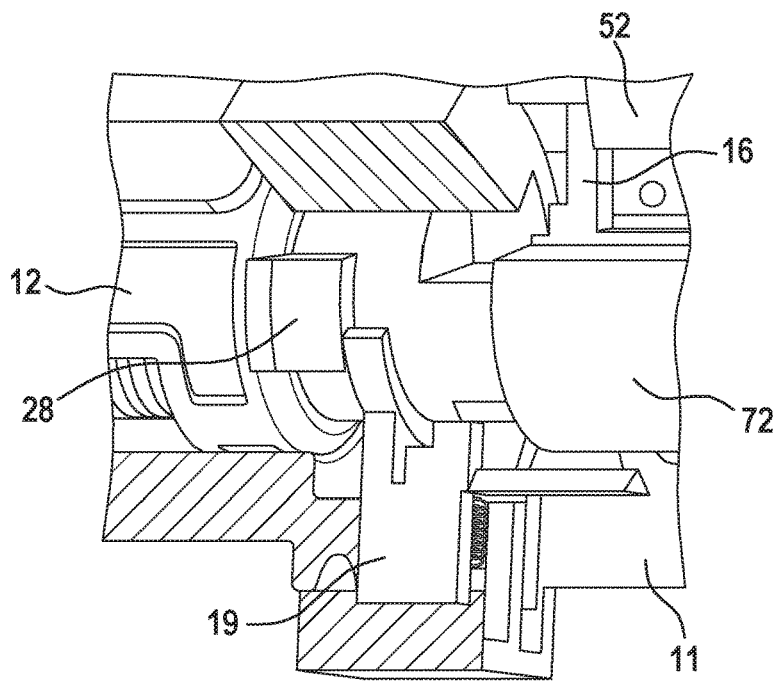
Figure 14E:
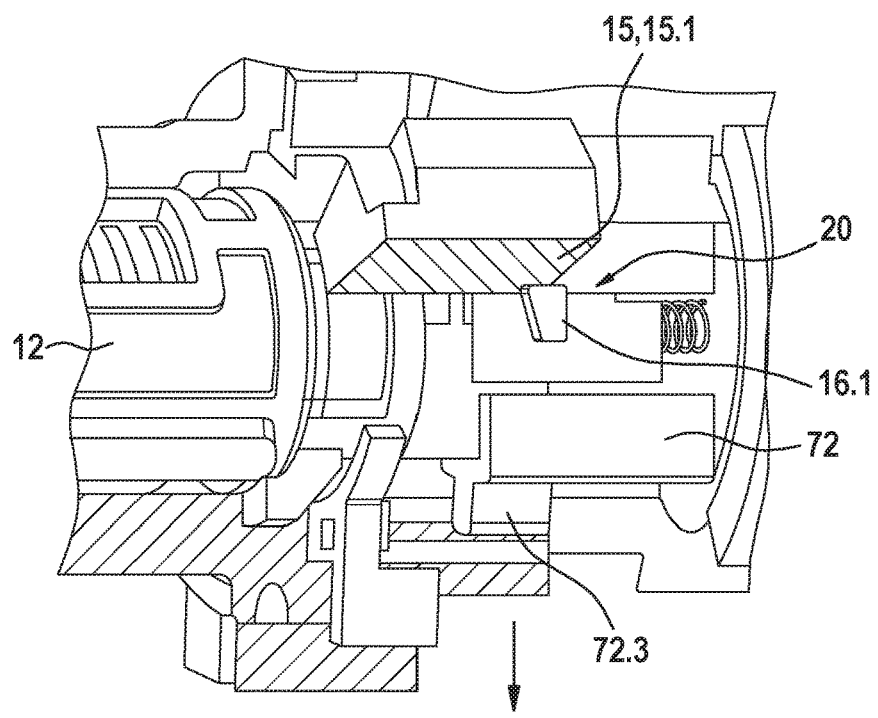
Figure 14H:
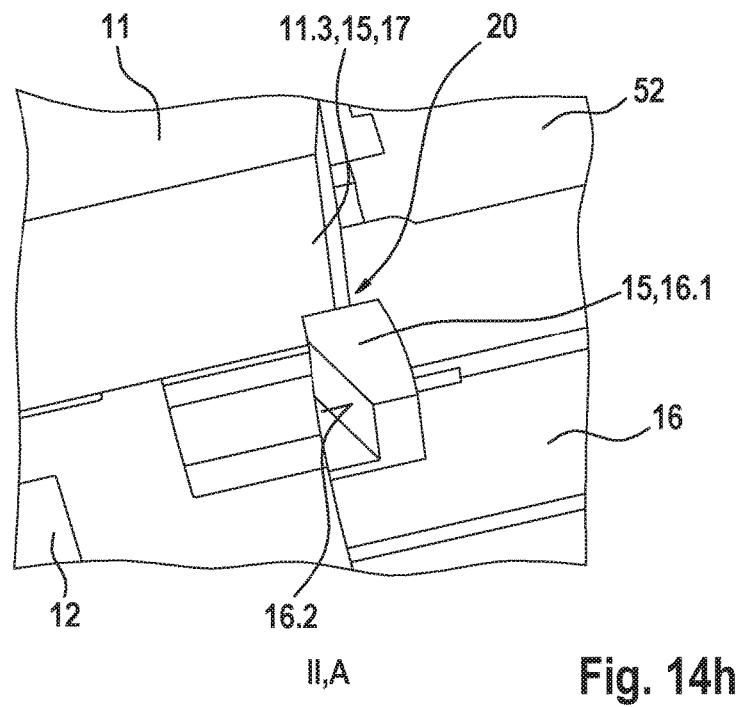
Figure 14I:
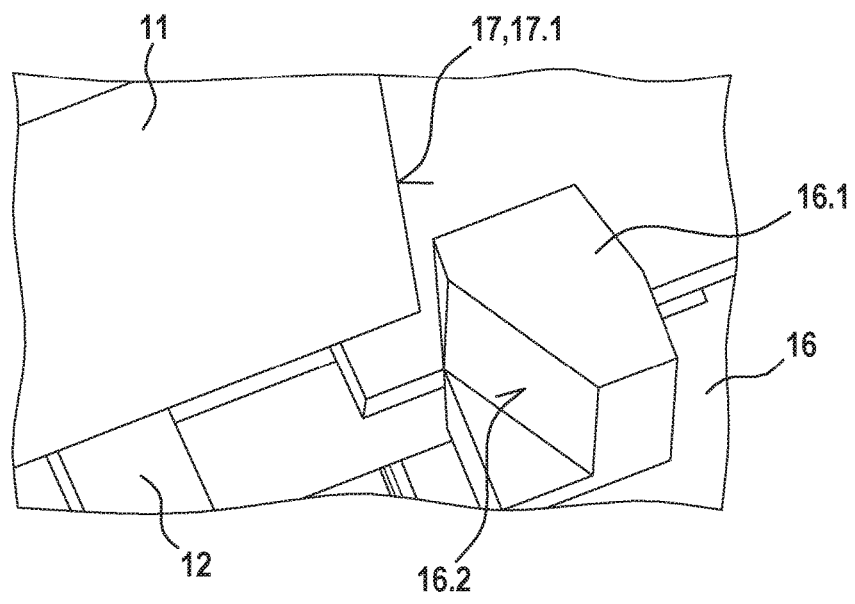
Figure 14J:
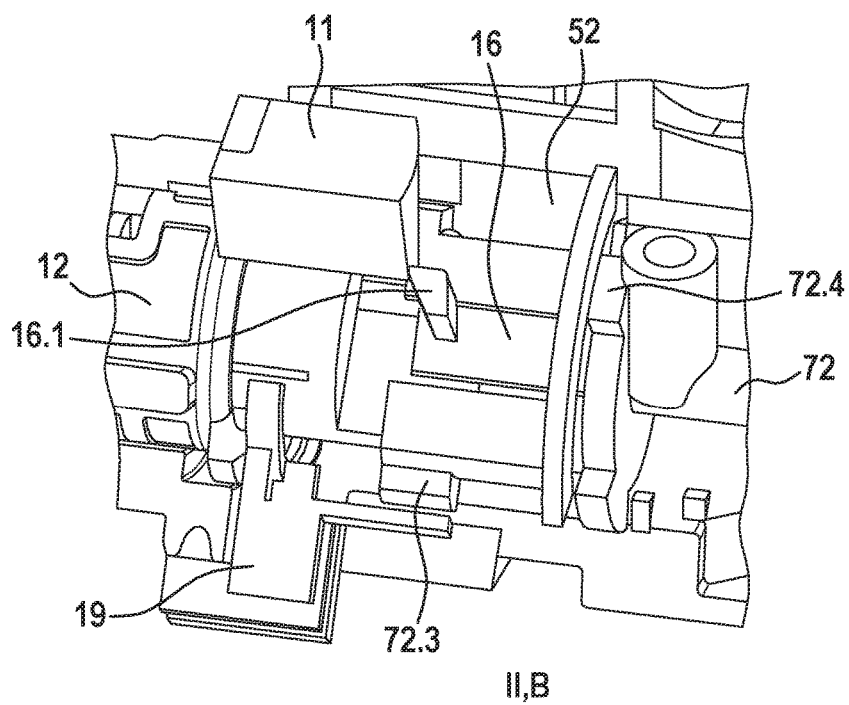

In FIG. 14d, the actuation element 19 further blocks an axial shifting of the cylinder core 12 by the form-fit with the latch 28. This form-fit can only be released in that the actuation element 19 is radially pushed against the spring 18 in the cylinder housing 11 by the circular projection 72.3 of the control element 72 which only occurs in the driving position II. In FIG. 14e, now the resetting block 15 is shown in the blocking position A wherein the adjustable blocking element 16 configures the form-fit 20 with the offset of the cylinder housing 11 with its cam 16.1. This form-fit 20 can only be released in that the cylinder core 12 is pushed into the cylinder housing 11 with the key 14 about the distance d wherein the cam 16.1 is guided along at the offset or projection 11.3 of the cylinder housing 11 which is shown in FIG. 14f1. This is however only possible when previously the actuation element 19 is pushed radially outwards in the cylinder housing 11 by the control element 72 wherein the form-fit between the latch 28 and the actuation element 19 is released. This situation is shown in FIG. 14f1 and from another perspective in FIG. 14f2. The movement direction of the cylinder core 12 and the actuation element 19 are shown by corresponding arrows. From FIG. 14f1, it can be recognized that the form-fit 20 is released in the releasing position B of the resetting block 15 which can also be recognized in FIG. 14i. In FIG. 14h, the form-fit between the adjustable blocking element 16 and the offset or the projection 11.3 of the cylinder housing 11 is shown in detail.

In FIGS. 14g1 and 14g2, the driving position II of the cylinder core 12 is shown with the blocking position A of the resetting block 15. Thereby, it can be recognized that at the L-like offset of the free edge 16.3 of the adjustable blocking element 16 the control element 16.2 in form of a leading slope is intended. In order to maintain the connection of the cylinder core 12 and the coupling element 52 in the axial shifting in the cylinder housing 11, initially the projection 72.4 can be intended at the control element 72 which keeps the coupling element 72 in the extended position in the corresponding driving position II (see FIG. 14g2).

In FIG. 14j, again the illustration of the cylinder core 12 in the driving position II is shown wherein in the blocking position A is overcome by pressure of the cylinder core 12 such that the resetting block 15 is in the releasing position B. Thereby, an offset (see lower right in FIG. 14j) at the housing serves for the fact that the control element 72 is not axially shifted too far.

Naturally; the shown embodiments of the present invention should not illustrate limitations. Thereby, all combinations of the single technical features of the inventions as described in the description are possible.

REFERENCE LIST

10 Lock cylinder
11 Cylinder housing
11.1 Surface shell
11.2 Recess, particularly for 13
11.3 Projection, particularly for 23
11.4 Cap
12 Cylinder core
12.1 Key channel for 14
12.2 Insertion opening for 14
12.3 Outer surface shell
12.4 Frontal surface 12.5 Longitudinal shift
12.6 Cap
12.7 Spring for 13
12.8 Blocking member retainer
12.9 Spring hole for 12.7
12.10 Cam, particularly for 15, 19
13 Blocking member for 12
14 Key
14.1 Key bit
14.2 Key head
14.3 Electronic component
15 Resetting block
15.1 Stationary part of 15
15.2 Movable part of 15
15.3 Movable coupling element
15.4 Longitudinal guidance for 72
15.5 Operating path for 74
16 adjustable Blocking element
16.1 Cam
16.2 Control element, particularly leading slope
16.3 Free edge, particularly with L-like offset
17 Blocking path
17.1 Offset
18 Spring, particularly for 15, 16 or 19
19 Actuation element for 16
19.1 Knob
19.2 Ring
20 Form-fit of 16
21 Control area of 16
22 Safety element, particularly hardened
23 Shifting element
23.1 First section
23.2 Second section
23.3 Rotation point
25 Transponder for 14
26 Key detraction blocker
26.1 Blocking lever
26.2 Rotation point of 26.1
26.3 Gear, particularly lifting magnet
27 Blocking element for repeated starting
28 Latch, particularly for cylinder core 12
50 Ignition starter switch
52 Coupling element, particularly for 15 and 72
53 Spring, particularly pressure spring
70 Wheel lock
71 Locking bolt for functionally essential component
72 Control element for 71
72.1 Actuator for 50
72.3 Circular projection, particularly with L-like offset
72.4 Projection, particularly for 52
73 Spring for 71
74 Position sensor
75 Fastening means for 70
75.1 Retainer for steering-column
Layers of the Resetting Block
A Blocking position of 15
B Releasing position of 15
Positions of the Cylinder Core
0 Off-position
I ACC-position
II Driving position
III starting position

What is claimed is:

1. Lock cylinder for at least an ignition starter switch or a wheel lock at a vehicle with a cylinder core which is at least pivotably received in a cylinder housing
wherein in the cylinder core at least one blocking member is provided which prevents a rotation of the cylinder core in the cylinder housing in a blocking position and in a releasing position releases a rotation in the cylinder housing and
wherein a key channel extends through the cylinder core in which a key is insertable and with which the at least one blocking member is movable between the blocking position and the releasing position and
wherein by the cylinder core at least two rotation positions can be occupied, namely an off-position and a starting position wherein in the off-position the key is insertable and detractable in the key in the starting position at least an appliance, particularly a starter of the vehicle can be switched on,
characterized in that
a particularly mechanical resetting block is existent which prevents a resetting of the cylinder core at least from the starting position to the off-position by a particularly simple rotation of the cylinder core;
the resetting block comprises an adjustable blocking element which in a blocking position mechanically blocks the rotation of the cylinder core from the driving position into the off-position and in a releasing position releases the rotation of the cylinder core into the off-position;
the adjustable blocking element comprises a peak and a backward edge, a movable part of the resetting block is mechanically engageable with the backward edge, and a stationary part of the resetting block further comprises a blocking path for receiving the peak;
wherein, in the blocking position, the peak is form-fittingly received in the recess; and, in the releasing position; the form-fit of the peak in the recess is repealed, and wherein movement of the adjustable blocking element from the recess is in a linear direction.

2. Lock cylinder according to claim 1,
characterized in that
the resetting block prevents a resetting of the cylinder core from a driving position to the off-position, particularly in an ACC-position by a particularly exclusive rotation of the cylinder core.

3. Lock cylinder according to claim 1,
characterized in that
the cylinder core comprises at least three stable rotation positions, namely the off-position, an ACC-position and a driving position in which the cylinder core is fixed by a fixing element, particularly in a form- and force-fitting manner.

4. Lock cylinder according to claim 3,
characterized in that
the resetting block blocks the cylinder core, particularly in a form-fitting manner, with a simple rotation of the cylinder core from the starting position into the off-position
wherein particularly the resetting block blocks the cylinder core from the driving position into the off-position, particularly in the ACC-position.

5. Lock cylinder according to claim 1,
characterized in that
the cylinder core comprises at least one instable rotation position, namely the starting position which is only achievable against a particularly permanently acting additional turning force.

6. Lock cylinder according to claim 1,
characterized in that
the resetting block is assembled between the cylinder housing and the cylinder core, particularly between an inner surface shell of the cylinder housing and an outer surface shell of the cylinder core or that the resetting block is assembled in an axial extension of the cylinder core.

7. Lock cylinder according to claim 1,
characterized in that
the adjustable blocking element of the resetting block is transferable from the blocking position into the releasing position by a longitudinal shift of the cylinder core or by an actuation of an actuation element which mechanically interacts with the adjustable blocking element.

8. Lock cylinder according to claim 7,
characterized in that
the actuation element is configured as a knob, ring or key.

9. Lock cylinder according to claim 1,
characterized in that
the adjustable blocking element of the resetting block is transferable from the blocking position into the releasing position by a pressure force or tensile force to the key which is inserted in the key channel of the cylinder core wherein a longitudinal shift of the cylinder core in the cylinder housing is provokable.

10. Lock cylinder according to claim 1,
characterized in that
the adjustable blocking element is assembled in or a e cylinder housing and the blocking path is assembled in or at the cylinder core.

11. Lock cylinder according to claim 1,
characterized in that
the adjustable blocking element of the resetting block is assembled rigidly to the cylinder housing, particularly in form of a cam with a control element, particularly in form of a leading slope and mechanically interacts with at least one longitudinally shiftable coupling element with the blocking path of the resetting block
wherein preferably the coupling element is pushable against the cylinder core, particularly by a spring, and is configured torque-proof with the cylinder core.

12. Lock cylinder according to claim 1,
characterized in that
between the cylinder housing and the cylinder core a shifting element is intended, particularly in form of a lever element which supports an axial shifting of the cylinder core to the cylinder housing.

13. Lock cylinder according to claim 1,
characterized in that
a key detraction blocker is existent which interacts with the key, particularly the key bit, and a locking bolt of a wheel lock in a way that the locking bolt remains in the releasing position until a withdrawal of the key from the key channel has occurred.

14. Lock cylinder according to claim 1,
characterized in that
a blocking element for repeated starting is existent which prevents the cylinder core from being more than once transferable directly from the driving position into the starting position.

15. Wheel lock for blocking a functionally essential component of a vehicle,
characterized in that
at least a cylinder core according to claim 1 or an ignition starter switch is existent wherein the ignition start switch is in mechanical operative connection with the lock cylinder via a coupling element.

16. Wheel lock according to claim 15,
characterized in that
at least a transponder, particularly in form of a coil, is intended in the area of an insertion opening of the key channel wherein at least a data exchange or an energy exchange is transferable to an electronic component of the key.

17. Wheel lock according to claim 15,
characterized in that
at least a rotation of the cylinder core by the resetting block, particularly in form of a longitudinally shiftable coupling element, is transferable to a control element for controlling a locking bolt or an ignition starter switch.

18. Method for operation of a lock cylinder or a wheel lock with at least one ignition starter switch at a vehicle with a cylinder core which is at least pivotably accepted in a cylinder housing
wherein in the cylinder core at least one blocking member is intended which in a blocking position prevents a rotation of the cylinder core in the cylinder housing and in a releasing position releases a rotation in the cylinder housing and
wherein a key channel extents through the cylinder core in which a key is insertable and with which the blocking member is movable between the blocking position and the releasing position and
wherein by the cylinder core at least two rotation positions can be occupied, namely an off-position and a starting position wherein in the off-position the key is insertable and detractable in the key channel and in the starting-position at least one appliance, particularly a starter; of the vehicle can be switched on,
characterized in that
a particularly mechanical resetting block is existent which prevents a resetting of the cylinder core at least from the starting position to the off-position by a particularly simple rotation of the cylinder core;
the resetting block comprises an adjustable blocking element which in a blocking position mechanically blocks the rotation of the cylinder core from the driving position into the off-position and in a releasing position releases the rotation of the cylinder core into the off-position;
the adjustable blocking element comprises a peak and a backward edge, a movable part of the resetting block is mechanically engageable with the backward edge, and a stationary part of the resetting block further comprises a blocking path for receiving the peak;
wherein, in the blocking position; the peak is form-fittingly received in the blocking path, and, in the releasing position, the form-fit of the peak in the blocking path is repealed, and wherein movement of the peak from the blocking path is in a linear direction;
the following steps are intended for the operation of the lock cylinder:
a) a switching-on rotation of the cylinder core occurs by the appropriate key from the off-position via at least an ACC-position or a driving position into the starting position,
b) a simple backward rotation of the cylinder core by the key in the off-position is blocked by the form-fitting insertion of the peak in the blocking path, particularly in the previous ACC-position, c) a manual actuation of the resetting block, particularly by an actuation of an actuation element of the resetting block, enables retraction of the peak from the blocking path in a linear direction, and thereby enables a released backward rotation of the cylinder core by the key in the off-position, particularly in the previous ACC-position.

19. Method for operation of a lock cylinder or a wheel lock according to claim 18, characterized in that the wheel lock is used for blocking a functionally essential component of the vehicle, and wherein the wheel lock comprises at least the cylinder core or an ignition starter switch wherein the ignition start switch is in mechanical operative connection with the lock cylinder via a coupling element.

* * * * *